(12) United States Patent
Kanemoto et al.

(10) Patent No.: US 6,810,147 B2
(45) Date of Patent: *Oct. 26, 2004

(54) DOCUMENT IMAGE PROCESSING APPARATUS FOR PROCESSING LINE PORTIONS MANUALLY INPUT TO DOCUMENT IMAGE, METHOD THEREFOR, AND COMPUTER READABLE RECORDING MEDIUM RECORDED WITH DOCUMENT IMAGE PROCESSING PROGRAM THEREFOR

(75) Inventors: Yuko Kanemoto, Nara (JP); Masashi Hirosawa, Tenri (JP); Masafumi Yamanoue, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/410,753

(22) Filed: Oct. 1, 1999

(65) Prior Publication Data

US 2003/0174907 A1 Sep. 18, 2003

(30) Foreign Application Priority Data

Oct. 1, 1998 (JP) ............................................ 10-279226

(51) Int. Cl.[7] .............................. G06K 9/00; G06K 9/18; G06K 9/36
(52) U.S. Cl. ....................................... 382/189; 185/292
(58) Field of Search ................................. 382/185, 186, 382/187, 189, 201, 291, 292, 309; 707/513; 178/18.01

(56) References Cited

U.S. PATENT DOCUMENTS

| 5,475,805 A | * | 12/1995 | Murata ........................ 707/513 |
| 5,614,926 A | * | 3/1997 | Shigematsu et al. ...... 178/18.01 |
| 5,696,841 A | * | 12/1997 | Nakatsuka ................... 382/174 |
| 5,812,697 A | * | 9/1998 | Sakai et al. ................. 382/186 |
| 6,327,384 B1 | * | 12/2001 | Hirao et al. ................. 382/173 |

FOREIGN PATENT DOCUMENTS

| JP | A61-273070 | 12/1986 | |
| JP | A5-181857 | 7/1993 | |
| JP | 05181857 A | * 7/1993 | ........... G06F/15/20 |
| JP | A8-30250 | 2/1996 | |
| JP | 08030250 A | * 2/1996 | ............ G09G/5/24 |

* cited by examiner

*Primary Examiner*—Mehrdad Dastouri
(74) *Attorney, Agent, or Firm*—Birch, Stewart, Kolasch & Birch, LLP

(57) ABSTRACT

A document image processing apparatus has the following construction in order to draw a manually input line portion along a desired character string in a document image in good style and high operability. More specifically, the image data of a document read by a scanner is displayed at a display portion. At this time, when the user operates a tablet to manually draw a line portion along a desired character string in the displayed document, a row region along which the manually input line portion is drawn is extracted from the region of the document image by a row extracting portion based on positional information represented by the input data of the manually drawn line portion and the document image data. The manually drawn line portion is corrected into a straight line along the extracted row region for display by curve correcting portion.

20 Claims, 21 Drawing Sheets

FIG.10A
とても美しい人
魚が木津川沿い
　　～～～L
の堤防の木陰で
FIG.10B
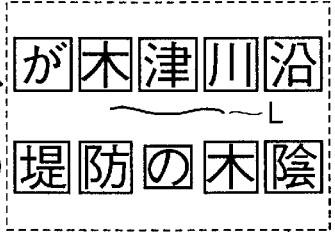
FIG.10C
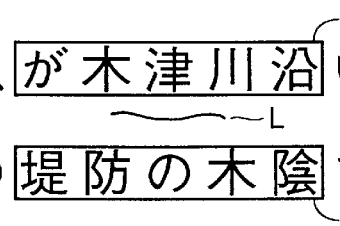
FIG.10D
とても美しい人
魚が木津川沿い
　　～～～L
の堤防の木陰で

とても美しい人

の堤防の木陰で　L

とても美しい人

の堤防の木陰で

とても美しい人

の堤防の木陰で

従 業 員　　専 用
　L(1)　　　　　　L(2)

LE1(1)　　　　　LE1(2)
従 業 員　　専 用

従 業 員　　専 用
　a↕　　　　　a↕
　L1　　　　　L2

従 業 員　　専 用
　a↕

DOCUMENT IMAGE PROCESSING APPARATUS FOR PROCESSING LINE PORTIONS MANUALLY INPUT TO DOCUMENT IMAGE, METHOD THEREFOR, AND COMPUTER READABLE RECORDING MEDIUM RECORDED WITH DOCUMENT IMAGE PROCESSING PROGRAM THEREFOR

BACKGROUND OF THE INVENTION

1. Field of the Invention

The present invention relates generally to a document image processing apparatus and a document image processing method for correcting a line portion manually input to a document including characters for display, and a computer readable recording medium recorded with a document image processing program therefor. The present invention more particularly relates to a document image processing apparatus and a document image processing method for correcting a manually input line portion at a desired position based the manner in which the line portion has been manually input, and a computer readable recording medium recorded with a document image processing program therefor.

2. Description of the Background Art

Japanese Patent Laying-Open No. 61-273070 discloses an image processing apparatus having an editing function of underlining a desired part of a read document image. The image processing apparatus has a display portion to display the read document image. When the user wants to underline a desired character string in a displayed document image, he/she designates the desired character string using a mouse device or the like and inputs a prepared editing command to "underline". As a result, the desired character string will be underlined. This kind of image processing apparatus is however poor in the operability because the user must input a command for editing while designating the region of a character string to be underlined on a string basis.

Japanese Patent Laying-Open No. 8-30250 discloses a document processing apparatus which underlines the image of a character string developed into a dot image. When the entire line of strings of characters whose sizes and kinds vary is underlined by the document processing apparatus, information related to rectangular regions surrounding the characters in the strings and a rectangular region surrounding all the character strings is used to place an underline at a desired position apart from the rectangular region surrounding all the character strings by an arbitrary distance. By the document processing apparatus, a line of character strings is underlined Therefore, only a particular character or a designated particular string of characters in an image including a plurality of lines of character strings cannot be underlined, which is not suitable for general-purpose use.

Japanese Patent Laying-Open No. 5-181857 discloses an information processing apparatus which allows the user to easily input and display modification information such as underlining for characters. In this information processing apparatus however only text data can be edited, and modification information for images cannot be input. Furthermore, an input region should be specifically provided for modification information for characters, which is disadvantageous.

The operation of manually drawing a line along a character string in a displayed document image is similar to the operation of drawing a line under a character string printed on a paper sheet, which has a high performance man machine interface. In the conventional manner of manual input, however, a manually input line portion is displayed as is, and therefore a line portion drawn over a character string by mistake is displayed as crossing the character string and the result sometimes turns out to be hard to read. A manually input, would-be straight line could be displayed as an awkward line which is not exactly straight. When different kinds of lines are input manually, an aiding tool such as scale is necessary, which is also disadvantageous in terms of the operability.

SUMMARY OF THE INVENTION

One object of the present invention is to provide an apparatus and a method for processing document images, which permits the user to manually draw a smooth line portion along an arbitrary character string in a document image with high operability, and a computer-readable recording medium recorded with a document image processing program therefor.

In order to achieve the above-described object of the invention, a document image processing apparatus according to one aspect of the present invention has the following construction. The document image processing apparatus includes a display portion to display document images, a line input portion to input a line portion manually drawn along an arbitrary character string in a document image displayed at the display portion, and a processing portion to process the input line portion. The processing portion has a direction determining portion to determine the direction of the manually drawn line portion, a row extracting portion and a line correcting portion. The row extracting portion extracts the region of a row including an arbitrary character string in the region of a document image based on a direction determined by the direction determining portion and one or more character images in the document image. The line correcting portion corrects a manually drawn line portion into a normal line portion drawn along the region of the row extracted by the row extracting portion for display at the display portion.

Therefore, by simply manually drawing a line portion through the line input portion to the image of an arbitrary character string of interest in the document image, a normal line portion can be drawn along the image of the arbitrary character string by the line correcting portion. As a result, by simply manually drawing a line portion to an arbitrary character string as desired, the user can place a good line portion along the arbitrary character string, in other words, the user may obtain a refined document image.

The processing portion in the above-described document image processing apparatus may further include a processing region designating portion to designate a processing region for processing a manually drawn line portion in a document image region.

By thus providing the processing region designating portion, the user can be released from operations such as designating a processing region in a document image in advance, which improves the operability. Since only a designated processing region is processed rather than the entire region of the document image, the processing portion can operate accurately and at high speed.

The row extracting portion in the above image processing apparatus may have a candidate region extracting portion and a row region determining portion. The candidate region extracting portion extracts at least one candidate region for a row based on a direction determined by the direction determining portion and the direction of the region of at least one character image in the region of the document image.

The row region determining portion determines the region of a row including an arbitrary character string in at least one candidate region extracted.

Therefore, if a plurality of regions are extracted by the candidate region extracting portion, the row region determining portion determines along which region among the plurality of candidate regions the manually drawn line portion has been placed. As a result, the user is released from operations such as designating the region of a row including an arbitrary character string along which a manually drawn line portion is placed, which improves the operability.

In the above-described document image processing apparatus, the normal line portion may be a straight line. Therefore, if an awkward line portion is manually drawn along an arbitrary character string, the manually drawn line portion can be corrected to a straight line portion for display.

In the above-described document image processing apparatus, the line correcting portion has a line kind recognizing portion to recognize the kind of a manually drawn line portion, and corrects the manually drawn line portion into a normal line portion based on the kind of line portion recognized.

Therefore, a manually drawn line portion can be corrected into a normal line portion based on the kind of the line portion (such as broken line and corrugated line), various kinds of line portions may be placed along an arbitrary character string in a fine style.

The line correcting portion in the above document image processing apparatus has an adjusting portion. The adjusting portion adjusts the length of a normal line portion into an optimum length based on the region of at least one character in the region of a row extracted by the row extracting portion.

As a result, using at least one character region in the region of an extracted row, in other words, based on the region of an arbitrary character string, the normal line portion can be adjusted to have an optimum length, so that a document image in a better style may be provided.

In the line correcting portion in the document image processing apparatus, a normal line position correcting portion is applied if one or more normal line portions have already been drawn along the region of a row extracted by the row extracting portion. The normal line position correcting portion corrects the position of a normal line portion corresponding to a manually drawn line portion such that the normal line portion is drawn continuously with those at least one line portions already drawn in the region of the corresponding row.

Therefore, if a normal line portion has already been drawn in the same row region including an arbitrary character string, a normal line portion corresponding to a newly input manually drawn line portion is corrected to be displayed connected to the already drawn normal line portion, a document image in a better style may be provided.

In the line correcting portion in the above-described document image processing apparatus, a manually drawn line position correcting portion is applied, if at least one manually drawn line portion is input to the region of a row extracted by the row extracting portion. The manually drawn line position correcting portion adjusts the position of normal line portions corresponding to those at least one manually drawn line portions and corrects them into a single, continuous normal line portion.

As a result, if a plurality of manually drawn line portions are input in the same row region, a plurality of normal line portions corresponding to these manually drawn line portions are corrected into a single continuous normal line for display, a document image in a better style may be provided.

In the above-described document image processing apparatus, the line correcting portion has a ruby row recognizing portion to identify that the region of a row extracted by the row extracting portion corresponds to a row of rubies (for giving the pronunciation ((in kana) of Chinese characters for example). If a region of a row is identified by the ruby row recognizing portion as corresponding to a row of rubies, a manually drawn line portion is corrected into a normal line portion to be placed along the row of rubies.

As a result, if an arbitrary character string corresponds to a row of rubies, a normal line portion can be drawn appropriately, so that a document image in a better style may be provided.

A method of processing a document image according to another aspect of the present invention includes the steps of displaying a document image, inputting a manually drawn line portion along the image of an arbitrary character string in a displayed document image, and processing an input manually drawn line portion. The processing step has the steps of determining the direction of a manually drawn line portion, extracting the region of a row including an arbitrary character string in the region of a document image based on a determined direction and the image of at least one character in the document image, and correcting a manually drawn line portion into a normal line portion to be drawn along the region of an extracted row for display.

Therefore, by simply drawing a line portion to the image of an arbitrary character string in a document image, the manually drawn line portion may be corrected into a normal line portion to be drawn along the image of the arbitrary character string, the line portion may be easily placed along the arbitrary character string and therefore a document image in a better style may be provided.

According to yet another aspect of the present invention, a computer-readable recording medium recorded with a document image program to allow a computer to execute the above-described document image processing method can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10A to 10D are illustrations for use in describing specific process related to a first embodiment of the present invention;

DESCRIPTION OF THE PREFERRED EMBODIMENTS

Embodiments of the present invention will be described hereinafter with reference to the drawings.

First Embodiment

Figure 1A:
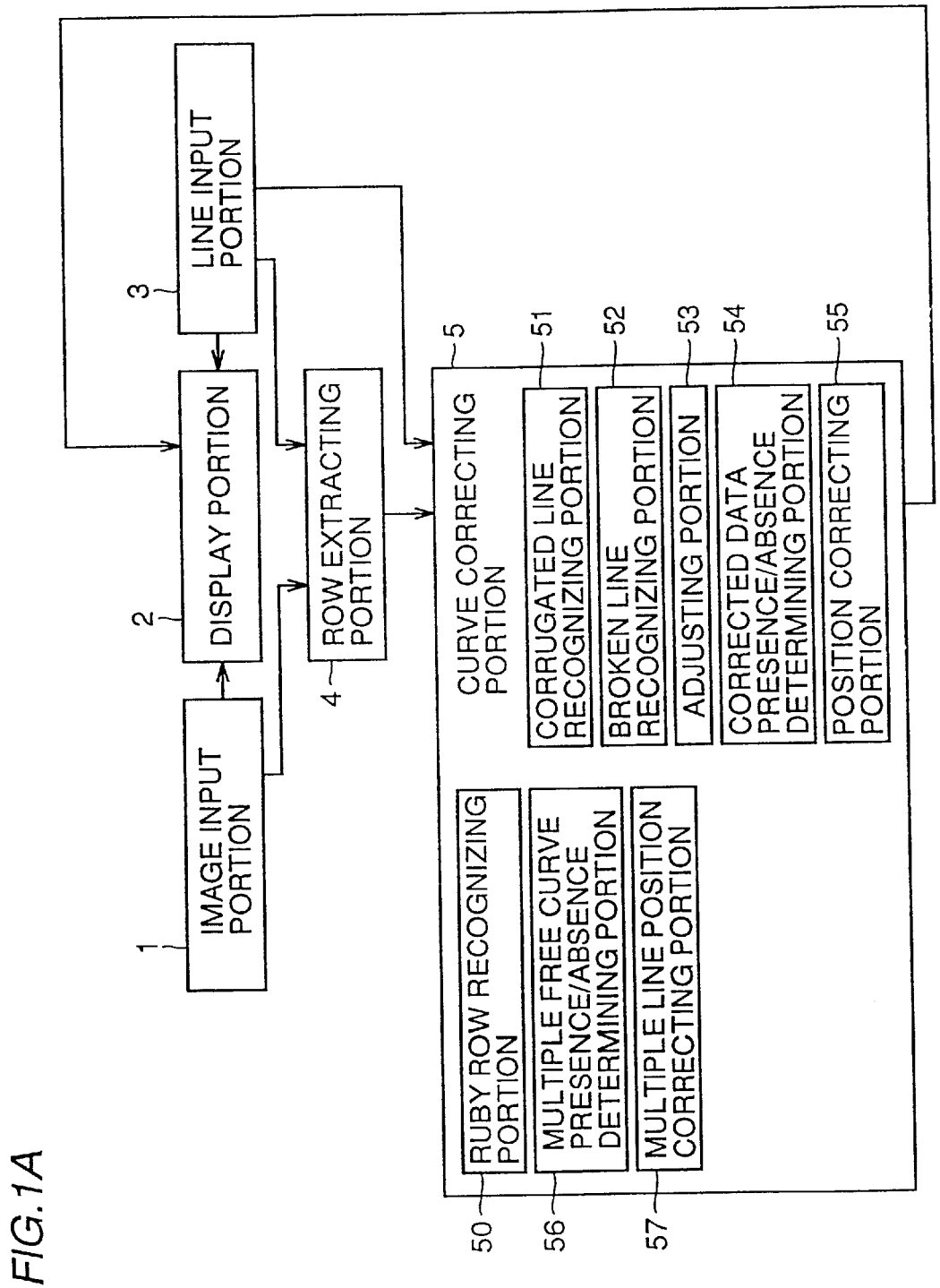
FIGS. 1A to 1C are block diagrams of the configuration of a document image processing apparatus according to the present invention.
Figure 1B:
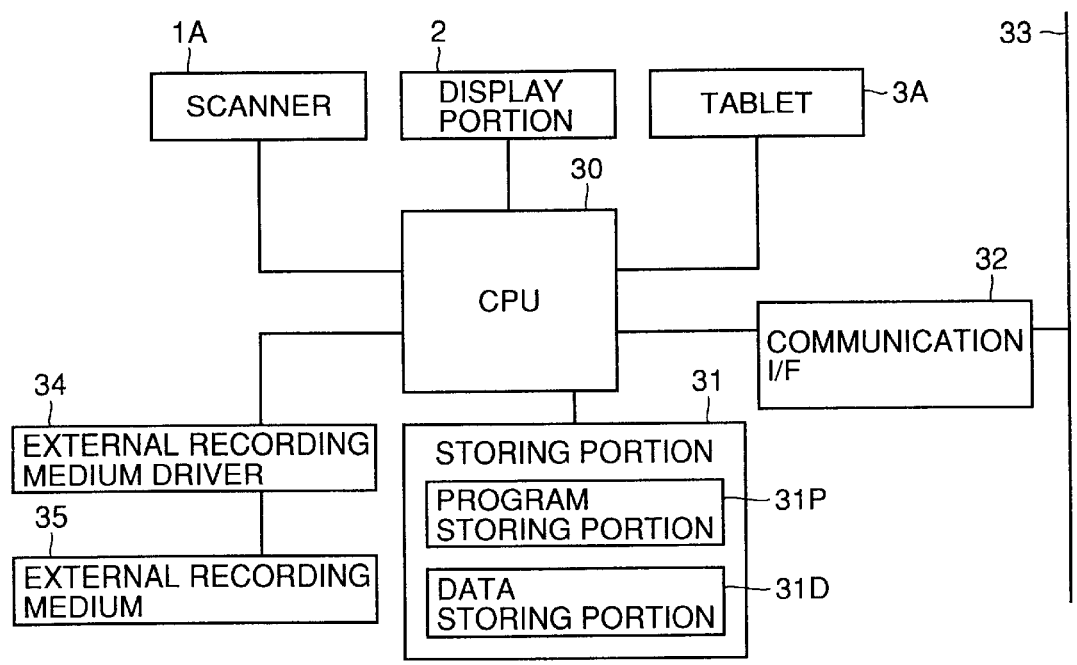

In FIGS. 1A and 1B, the function and hardware configuration of a document image processing apparatus according to each embodiment of the present invention are shown. In FIG. 1A, the document image processing apparatus includes an image input portion 1 to input image data in a document including characters, a display portion 2, a line input portion 3, a row extracting portion 4 and a curve correcting portion 5. Curve correcting portion 5 includes a corrugated line recognizing portion 51, a broken line recognizing portion 52 and an adjusting portion 53 which will be described in connection with a first embodiment, a ruby row recognizing portion 50, a corrected data presence/absence determining portion 54 and a position correcting portion 55 which will be described in connection with a second embodiment, and a multiple free curve presence/absence determining portion 56 and a multiple line portion position correcting portion 57 which will be described in connection with a third embodiment.

In FIG. 1B, the document image processing apparatus includes a CPU (Central Processing Unit) 30 to monitor and control the apparatus in a centralized manner, and connected to CPU 30 are a scanner 1A, an example of image input portion 1, display portion 2, a tablet 3A, an example of line input portion 3, a storing portion 31 including a program storing portion 31P to store various programs and a data storing portion 31D to store various pieces of data, a communication I/F (interface) 32 to connect a communication network 33 including the Internet, and an external recording medium driver 34 for accessing an external recording medium 35 storing various programs and various pieces of data.

Figure 1C:
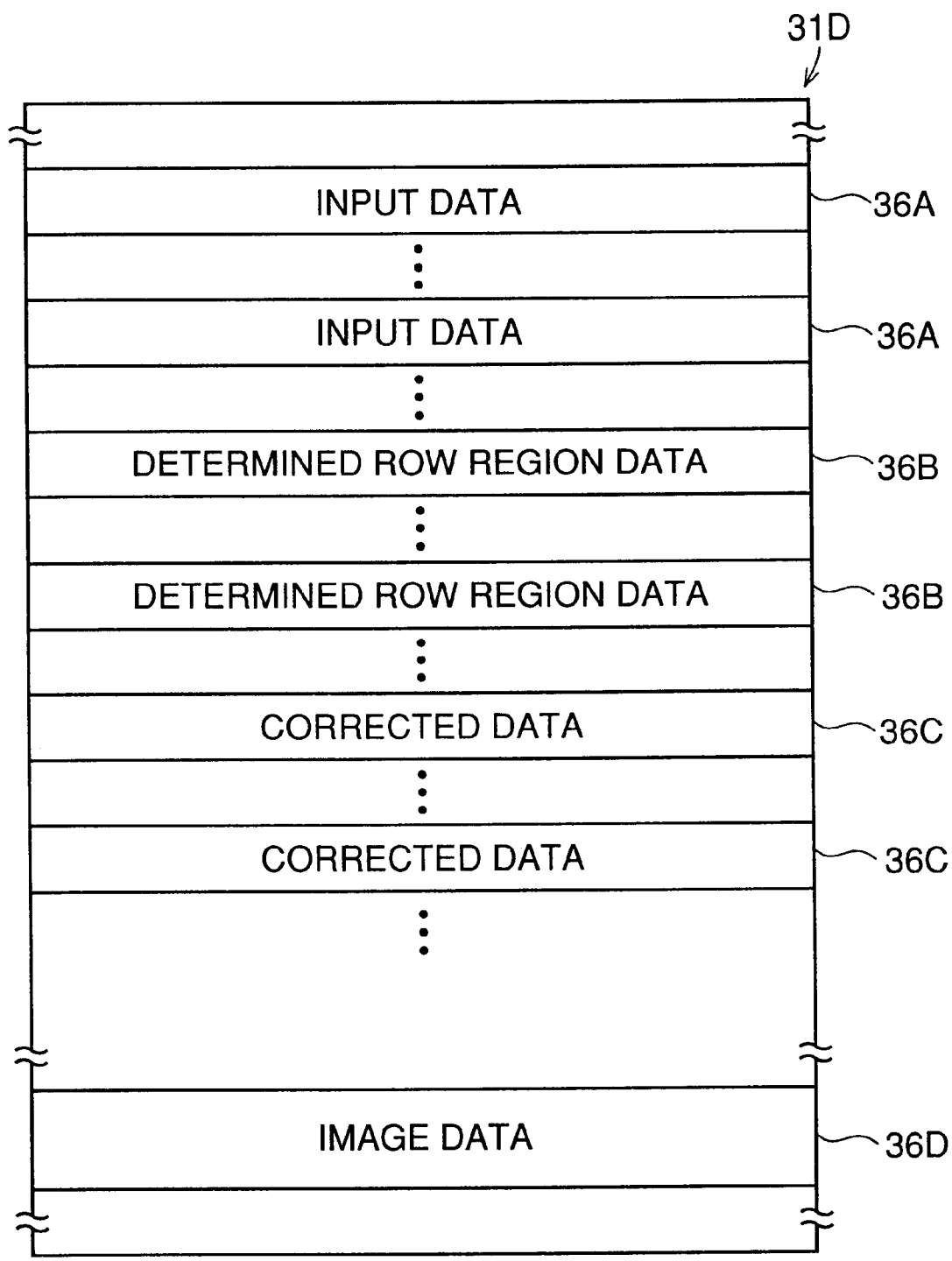

FIG. 1C shows an example of stored content in data storing portion 31D according to the first embodiment, details of which will be described later.

In the operation of the document image processing apparatus in FIG. 1A, document image data input by image input portion 1 is developed into a bit map font for display at display portion 2, and also stored as image data 36D in data storing portion 31D. The user operates line input portion 3 as he/she views the displayed document image and inputs a manually drawn freehand line portion (hereinafter as a free curve) along a character string at a desired position in the document image. The free curve includes inclined and not inclined straight lines and a bent line. The input free curve data is sequentially stored in data storing portion 31D as input data 36A. Then, row extracting portion 4 uses image data 36D and input data 36A to extract determined row region data 36B for application to curve correcting portion 5. Determined row region data 36B is information representing the region of a row along which the free curve is placed in the document indicated by image data 36D. Curve correcting portion 5 uses the applied determined row region data 36B and input data 36A to correct input data 36A as will be described, and the result is stored in data storing portion 31D as corrected data 36C. After correcting the free curve, a corrected free curve is displayed along a character string at a desired position in the document image displayed at display portion 2.

Scanner 1A which is an image reader such as an OCR (Optical Character Reader), copying machine and electronic camera is shown as image input portion 1 herein, but the invention is not limited to this. More specifically, a recording medium reader to read from a CD-ROM, a hard disk, a flexible disk, and a magneto-optical disk recorded with images by previously reading a document, or a semiconductor memory. The input of document image data is performed through communication network 33 in place of the use of image input portion 1.

Display portion 2 includes a display control portion and an output portion which are not shown. The output portion may be for example an image display such as CRT (Cathode Ray Tube) or LCD (Liquid Crystal Display). In operation, display portion 2 displays a document image based on image data 36D sent from image input portion 1 and displays a free curve based on input data 36A applied from line input portion 3 over the document image. After correcting the free curve, the display of the free curve based on input data 36A is deleted, and a line portion based on input data 36A after correction applied from curve correcting portion 5, in other words, a line portion based on corrected data 36C is displayed over the document image at display portion 2.

Herein, line input portion 3 is not limited to tablet 3A and may be a pointing device such as a mouse device, a cursor and a joy stick. Input data 36A for the free curve input by line input portion 3 is applied to display portion 2, row extracting portion 4 and curve correcting portion 5.

Row extracting portion 4 and curve correcting portion 5 include CPU 30 and storing portion 31.

Figure 2:
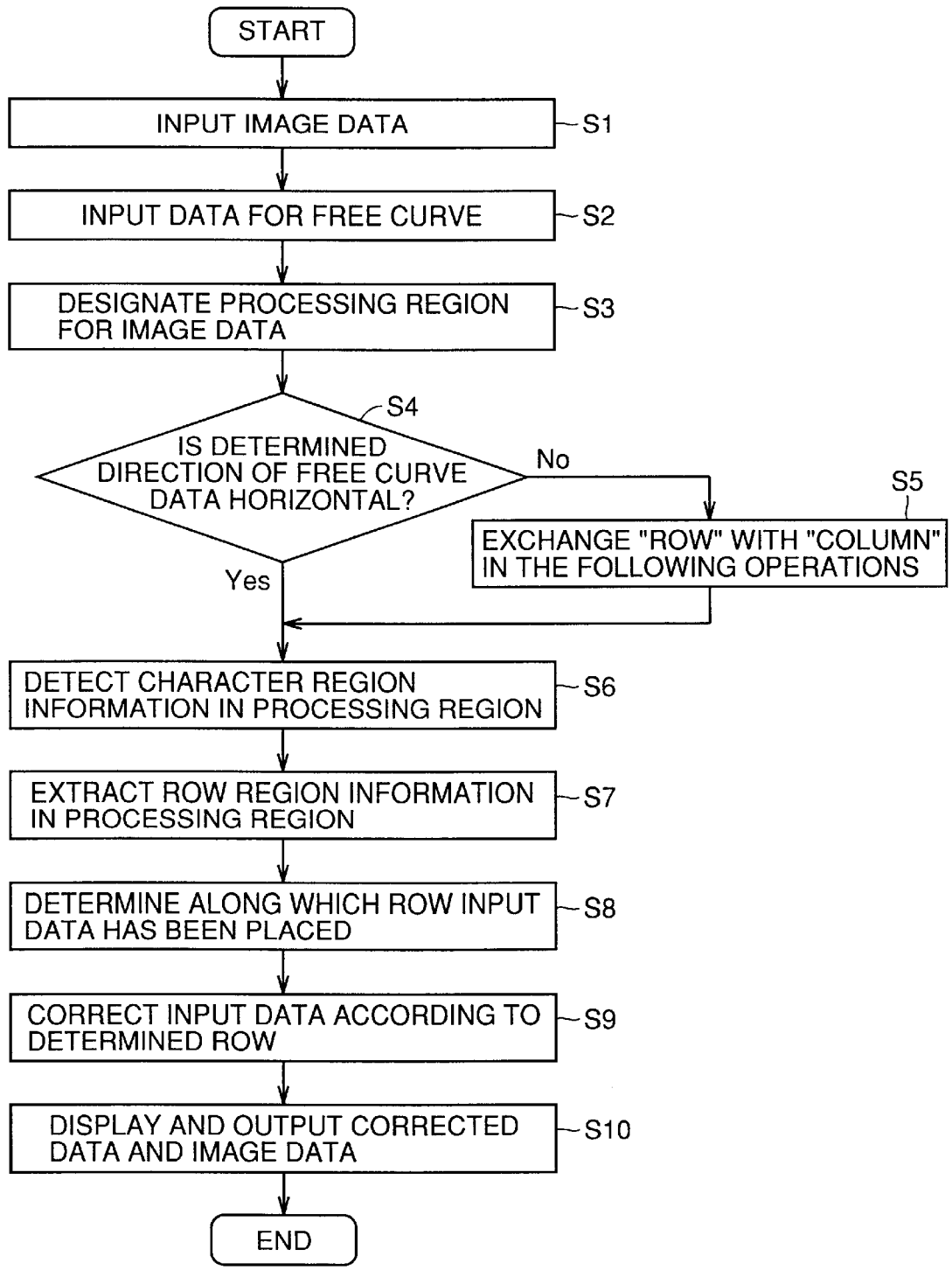
FIG. 2 is a schematic flow chart for use in illustration of process by the document image processing apparatus according to the present invention.

Referring to FIG. 2, the flow of the entire process by the document image processing apparatus according to the present invention will be now described. In step S1 (labeled as S1 in FIG. 2), image data 36D is input from image input portion 1. In the following description, the horizontal direction of the region of image data 36D developed in a bit map is referred to as the X-direction and the vertical direction as the Y-direction and the upper left end as the origin. In step S2, the user manually inputs a free curve from line input portion 3 as he/she views image data 36D displayed at display portion 2. Input data 36A is for example defined as a set of n coordinate values in time series such as (x(i), y(i)) (i=1 to n). Herein, input data 36A is set in the ascending order of the size of the input components of the free curve. In step S3, a region to be subjected to various processings which will be described is designated for the region of image data 36D, and the process after that is performed in this region. It is desirable to process the thus designated partial region rather than the entire region of image data 36D, because the processing speed increases.

It is determined in step S4 if the free curve has been input in the horizontal direction (the direction of row, the X-direction), in order to determine if the following process is performed to a row of characters written in the vertical direction (the X-direction), or a column of characters written in the horizontal direction (the Y-direction) in the document by image data 36D. If it is determined that the free curve has been input in the horizontal direction, the process in and after step S6 will be executed, but if it is determined otherwise, the process in step S5 is executed and for the process in and after step S6, the rows and columns are exchanged.

In step S6, in a processing region, region information on the characters is detected. In step S7, based on the detected character region information and the direction of the free curve represented by input data 36A, region information on a corresponding row is extracted. In step S8, based on the extracted row region information, it is determined along which row the free curve of input data 36A has been placed. In step S9, input data 36A is corrected as will be described such that a free curve is drawn along the determined row, whereby corrected data 36C is obtained. In step S10, a line portion based on corrected data 36C resulting from correction is displayed over the document by image data 36D at display portion 2. Herein, image input portion 1 in FIG. 1A has the function of step S1, display portion 2 has the function of step S10, line input portion 3 has the function of step S2, row extracting portion 4 the function of steps S3 to S8, and curve correcting portion 5 has the function of step S9.

Figure 3:
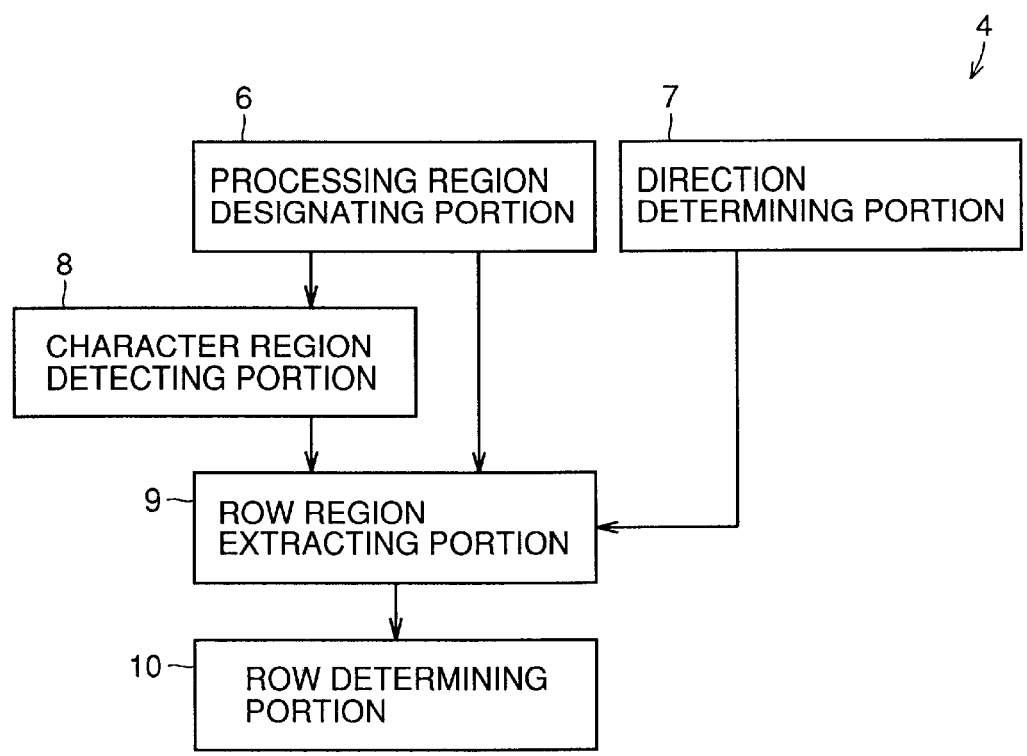
FIG. 3 is a block diagram of the configuration of a row extracting portion 4 in FIG. 1A.

Row extracting portion 4 in FIG. 1A will be now described. FIG. 3 shows the configuration of row extracting portion 4. In FIG. 3, row extracting portion 4 includes a processing region designating portion 6, a direction determining portion 7, a character region detecting portion 8, a row region extracting portion 9 and a row determining portion 10.

Processing region designating portion 6 serves to prevent a region apart from the free curve indicated by input data 36A from being affected by the process of detecting a character region or extracting a row which will be described. More specifically, the region to be subjected to the process of the character region detection or the row region extraction are designated within a prescribed range from the position of the free curve represented by input data 36A, which will be now described in detail in conjunction with FIG. 4A.

Figures 4A, 4B:
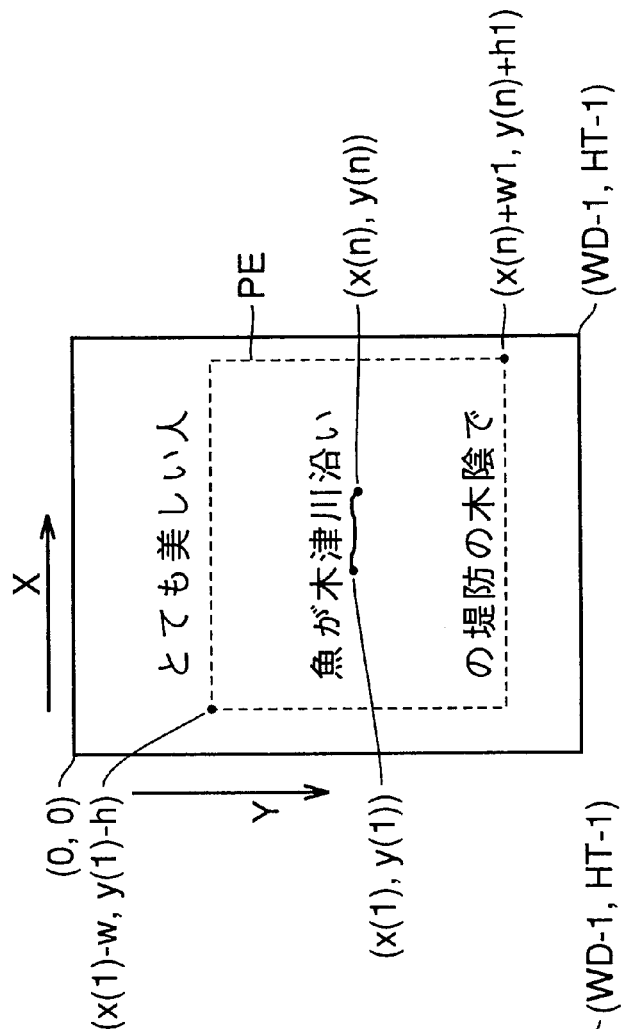
FIGS. 4A and 4B are illustrations showing a processing region designating portion 6 in FIG. 3.

FIG. 4A shows how a document corresponding image data 36D obtained from image input portion 1 is displayed at display portion 2. FIG. 4A shows the width WD of image data 36D in the X-direction and the height HT of image data 36D in the Y-direction. FIG. 4B shows how data for a free curve (input data 36A) is input for image data 36D displayed and a processing region PE (surrounded by a dotted line) is designated. Coordinate data (x(1), y(1)) at the initial point and coordinate data (x(n), y (n)) at the terminal point for free curve input data 36A (x(i), y(i)) (i=1 to n) are used to designate processing region PE as rectangular region data (x(1)−W, y(1)−H), (x(n)+W1, y(n)+H1). Note however that (x(1)−W, y(1)−H) represents a coordinate value at the upper left end of the rectangular region, and (x(n)+W1, y(n)+H1) represents a coordinate value at the lower right end of the rectangular region. Herein, variables W, H, W1 and H1 are each an arbitrary constant and if set to have a value a constant multiple of the line or character space in image data 36D in the document, processing region PE corresponding input image data 36D can be designated. Note that processing region PE is automatically set based on positional information represented by input data 36A for the free curve according to this embodiment, but the invention is not limited to this. More specifically, processing region PE may be designated using tablet 3 or the like as desired.

Direction determining portion 7 determines whether the free curve has been input in the X-direction or Y-direction. The process of determining the direction will be now described in conjunction with the flow chart in FIG. 5. In step S21, the absolute value |x(1)−x(n)| of the difference in the X-direction and the absolute value |y(1)−y(n)| of the difference in the Y-direction between coordinates (x(1), y(1)) at the initial point and coordinates (x(n), y(n)) at the terminal point for free curve input data 36A (x(i), y(i)) (i=1 to n) are compared, and if the former is greater, it is determined in step S22 that the free curve has been drawn in the X-direction. If the latter is greater, it is determined in step S23 that the free curve has been drawn in the Y-direction.

Figure 5:
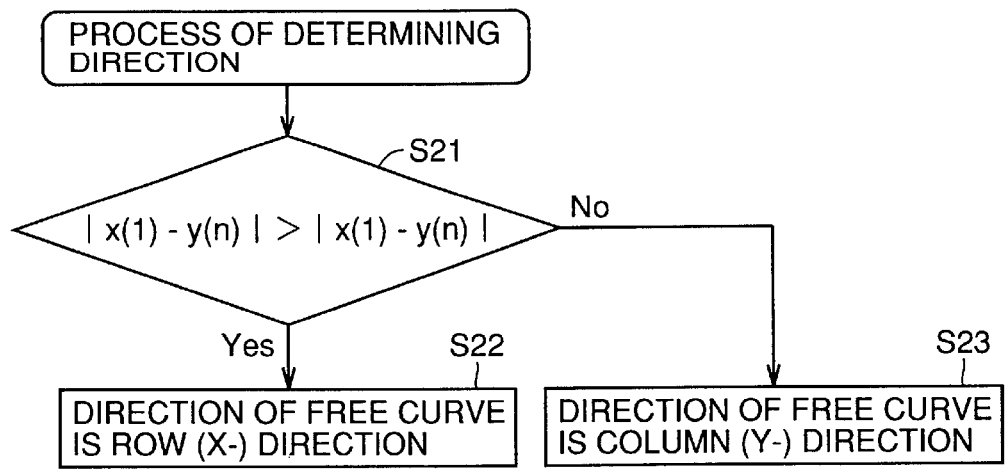
FIG. 5 is a flow chart for use in illustration of the process of determining the direction of a free curve by a direction determining portion 7 in FIG. 3.
Figure 6:
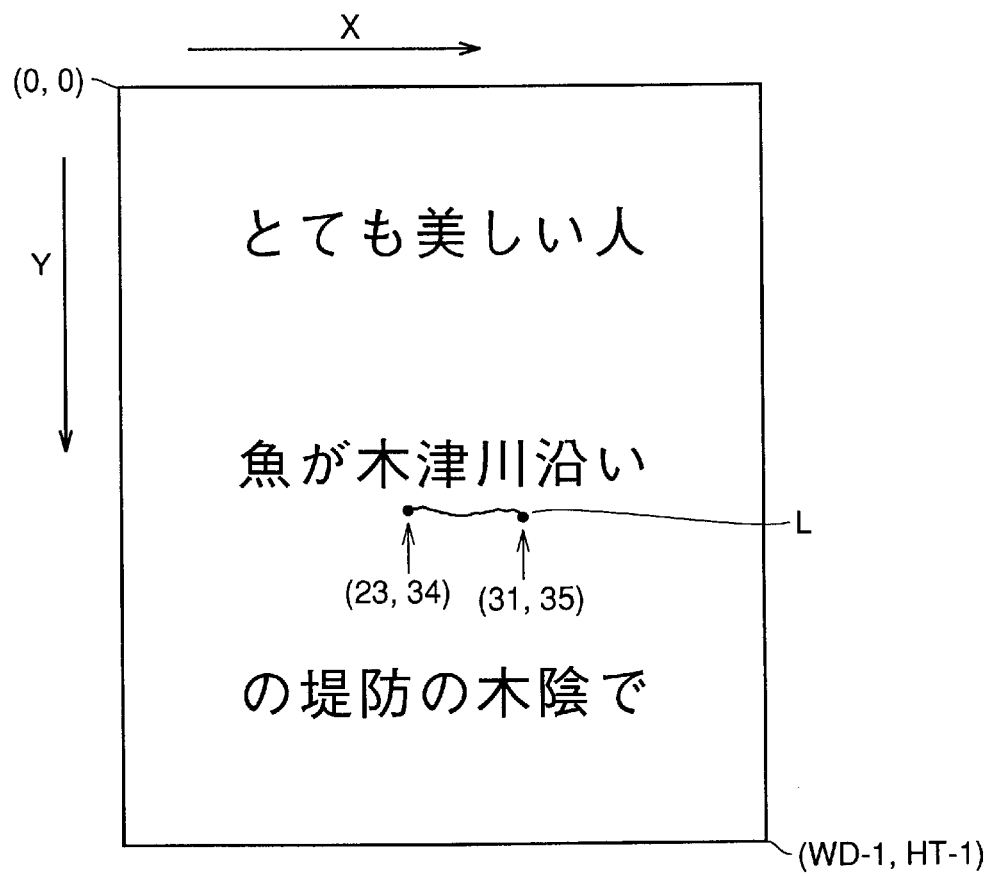
FIG. 6 is an illustration for use in describing a direction determining portion 7.

FIG. 6 shows a specific example of the process shown in FIG. 5. The absolute value of the difference in the X-direction between coordinates (23, 34) at one terminal point of a free curve L and coordinates (31, 35) at the other terminal point is 8 (=|23−31|), the absolute value of the difference in the Y-direction is 1 (=|34−35|), and therefore the former is greater. It is therefore determined that input data 36A for manually drawn, free curve L has been input in the X-direction to the image data 36D of the document.

Figure 7A:
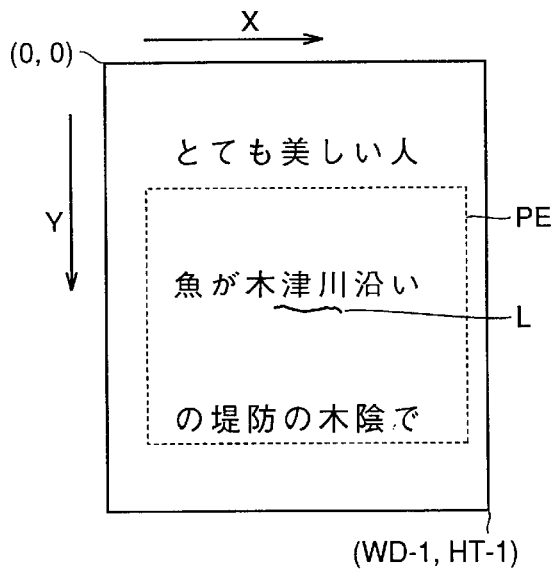
FIGS. 7A to 7F are illustrations for use in describing a character region detecting portion 8 in FIG. 3.
Figure 7D:
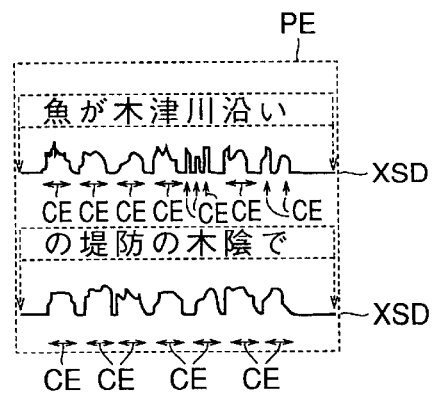
Figure 7B:
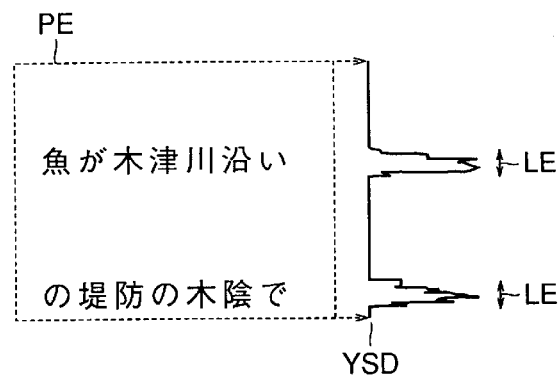
Figure 7E:
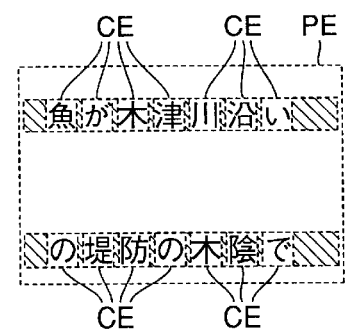
Figure 7C:
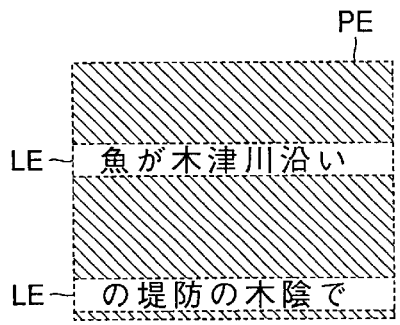
Figure 7F:
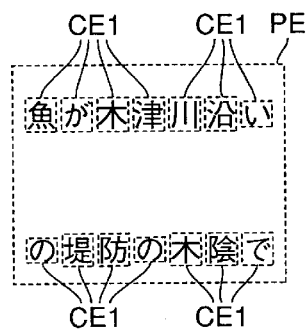

Character region detecting portion 8 detects a character region based on the direction of free curve input data 36A for image data 36D in processing region PE. As an example of the method of detecting a character region, projection in each of the X- and Y-directions is employed. In a projection method, the gray tone level data on the character part and empty part of image data 36D is for example projected in a designated direction. More specifically, a projection of image data 36D in the Y-direction (or X-direction) is taken and processing region PE is divided into at least one row region to be a candidate (or at least one column region to be a candidate) and the other regions. A projection of that at least one row region (or column region) to be a candidate is similarly taken in the X-direction (or Y-direction), so that processing region PE is divided into at least one region to be character candidate and the other regions. For each of the candidate regions, a projection in the Y-direction (or X-direction) is similarly taken, so that at least one character region is detected. This will be now described in conjunction with FIGS. 7A to 7F. If for example a free curve L is input in the X-direction (see FIG. 7A), a projection YSD of processing region PE for image data 36D in the Y-direction (denoted by the dotted arrow in the figure) is taken before the input of free curve L (see FIG. 7B). Processing region PE is divided into a plurality of row regions LE to be a plurality of candidates and the other regions (denoted in the shadow in the figure, see FIG. 7C). Then, a projection XSD of each of row regions LE to be a candidate is taken in the X-direction (denoted by the dotted arrow in the figure) (see FIG. 7D), and then processing region PE is divided into at least one character region CE to be a candidate and the other regions. In FIG. 7D, the character "川" or "レヽ" is one character but the character regions of these characters are each divided into a plurality of character regions CE. Therefore, in order to correctly detect character region CE for each of such characters, character regions CE are merged into one character region CE if the distance between these character regions CE in the X-direction is not more than a certain threshold value V (see FIG. 7E). Note however, threshold value V is an arbitrary constant, and if the value is set to a constant multiple of the character distance in the document of data 36D, processing corresponding to image data 36D may be performed. Furthermore, when a projection YSD of each character region CE in the Y-direction is taken, a character region CE1 for each character is finally detected (see FIG. 7F).

Figure 8A:
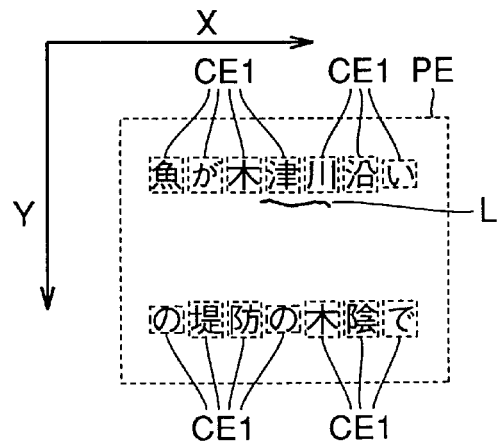
FIGS. 8A to 8C are illustrations for use in describing a row region extracting portion 9 in FIG. 3.
Figure 8B:
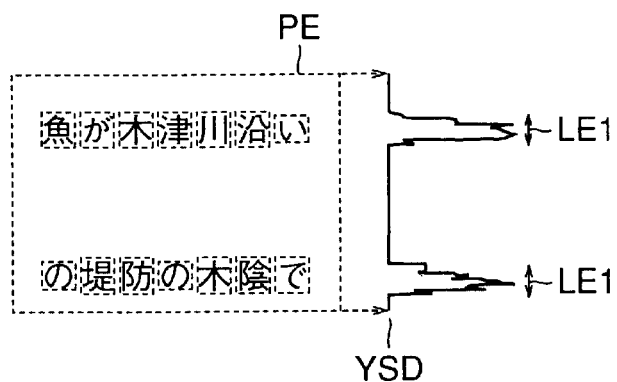
Figure 8C:
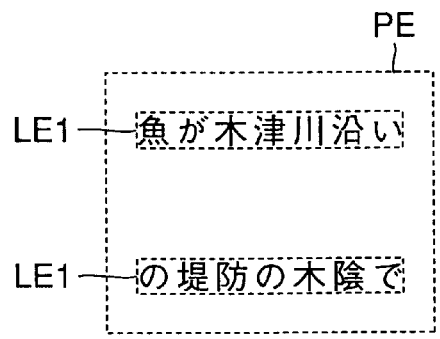

Row region extracting portion 9 extracts a row region based on the direction of the input data 36A of free curve L for image data 36D in processing region PE. As an example of the method of extracting a row region, projections XSD and YSD of each character region CE1 in the X- and Y-directions may be used. According to this method, a projection is taken in the direction perpendicular to the direction of input data 36A for information on each character region CE1, a row region (or a column region) can be extracted. More specifically, let us now assume that information on a plurality of character regions CE1 as shown in FIG. 8A has been previously detected. Since free curve L has been known to run in the X-direction, when a projection YSD in the Y-direction is taken (see FIG. 8B), row region LE1 may be extracted (see FIG. 8C). Row region LE1 may be extracted without using such information of the plurality of character regions CE1. If for example in a projection XSD in the X-direction in FIG. 7D, information on both ends is cut out, at least one row region LE1 is extracted.

Each of the extracted row regions LE1 is defined by rectangular region data ((s(j), t(j)), (u(j), v(j))), (j=1 to m). Note however that variable m represents the total number of row regions LE1 extracted, variable (s(j), t(j)) represents coordinates on the upper left end of the rectangular region, and variable (u(j), v(j)) represents coordinates on the lower right end of the rectangular region. Information on at least one row region LE1 thus extracted is temporarily stored in an internal memory (not shown) in CPU 30.

Figure 9:
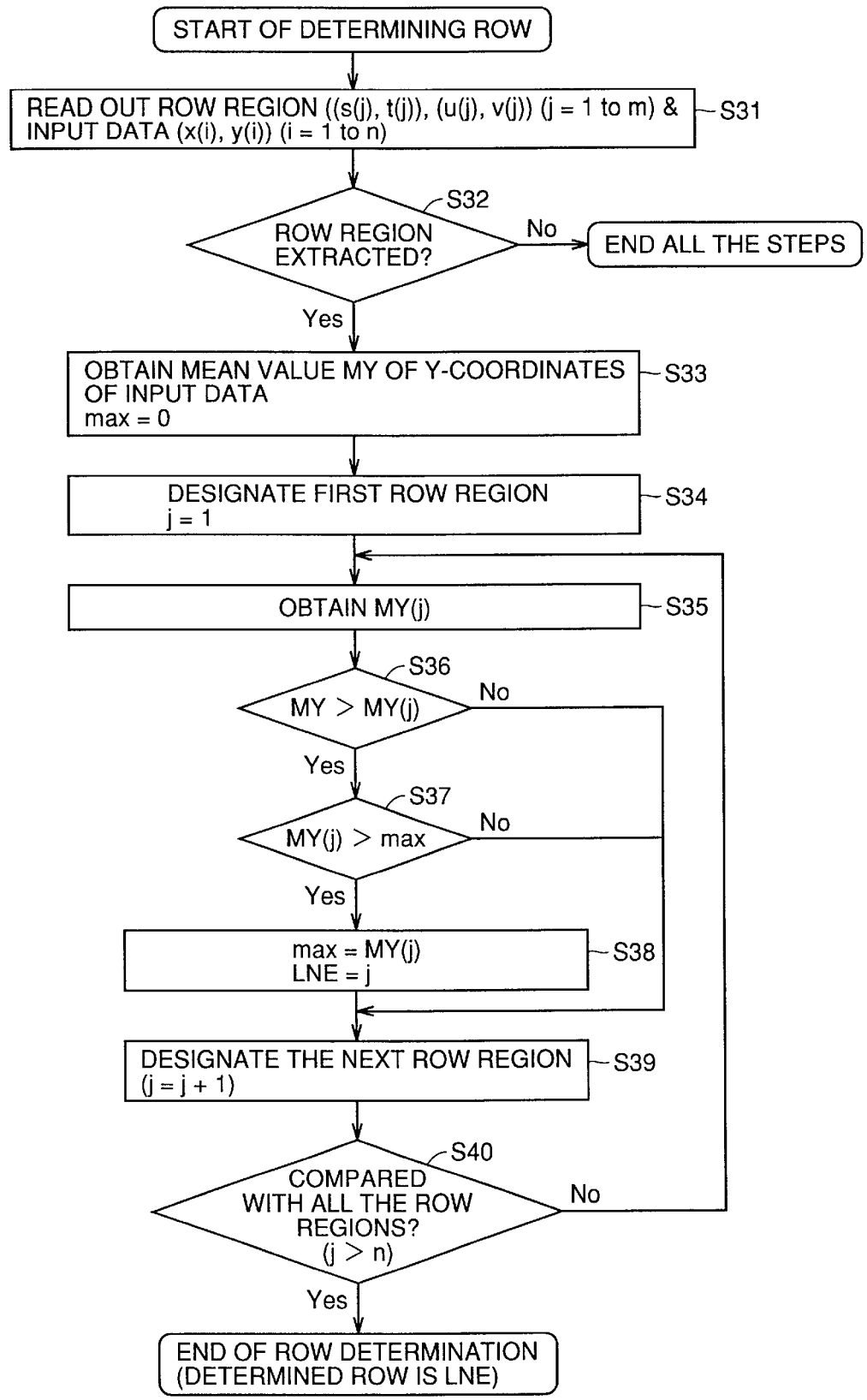
FIG. 9 is a process flow chart for use in illustration of a row determining portion 10 in FIG. 3.

Row determining portion 10 determines along which row free curve L has been placed in the document of image data 36D. In order to determine the row, the data of at least one row region LE1 ((s(j), t(j)), (u(j), v(j))) (j=1to m) and the input data 36A (x(i), y(i)) (i=1 to n) of free curve L are used. More specifically, if free curve L has been input in the X-direction, the mean value MY(=(y(1)+y(2)+ . . . +y(n)/n) of the y-coordinates of the input data 36A for free curve L are compared to the mean value MY(j)(=(t(j)+v(j))/2)(j=1 to m) in information on row region LE1 in the Y-direction, and the row along which free curve L has been drawn is determined. Referring to the flow chart in FIG. 9, the processing by row determining portion 10 will be described about the case in which free curve L has been input in the X-direction. In step S31, the data of row region LE1((s(j), t(j)), (u(j), v(j)) (j=1 to m) and the input data 36A (x(i), y(i)) (i=1 to n) of free curve L are read out from the internal memory in CPU 30 which is not shown and from data storing portion 31D. It is determined in step S32 if at least one row region LE1 has been extracted by row region extracting portion 9. If row region LE1 has not been extracted, it is assumed that there exists no character in the vicinity of free curve L, therefore all the steps are completed, and correction by curve correcting portion 5 is not performed for the input data 36A of free curve L.

Meanwhile, if row region LE1 has been extracted by row region extracting portion 9, in step S33, the mean value MY of the y-coordinates of the input data 36A of free curve L is obtained, and the maximum value of the mean value MY(j) in the Y-direction is set for data in row region LE1, and therefore variable max is set to 0. In step S34, variable j is set to 1, and the data of the first row region LE1 is designated. In step S35, mean value MY(j) is obtained. In step S36, in order to determine if row region LE1 of interest is in the negative direction along the Y-axis, it is determined if MY>MY(j) is established. If the relation is established, the control proceeds to step S37, and otherwise the data of the next row region LE1 is designated in step S39.

In step S37, among at least row regions LE1 satisfying the condition of step S36, row regions LE1 positioned in the positive direction along the Y-axis would be closer to free curve L, and therefore it is determined if MY(j)>max is established. If the relation is established, the control proceeds to step S38, otherwise in step S39, information on the next row region LE1 is designated. In step S38, variable max is set to MY(j), variable LNE is set to "j", and the data of the next row region LE1 is designated in step S39. Note that variable LNE is a variable to specify row region LE1 along which free curve L has been drawn.

It is determined in step S40 if the data of all the row regions LE1 read out in step S31 has been processed. If the processing is not complete, the control returns to step S35, otherwise the series of process steps are completed, and row region LE1 represented by the value of variable LNE is determined to be a row along which free curve L has been drawn. This row will be hereinafter referred to as the "determined row".

The determined row is stored in data storing portion 31D as determined row region data 36B defined as rectangular region data ((s, t), (u, v)). Note however that variable (s, t) is coordinates on the upper left end of the rectangular region and variable (u, v) represents coordinates on the lower right end of the rectangular region. If free curve L has been input in the Y-direction, in the process shown in FIG. 9, variables MY and MY(j) are replaced by variables MX and MX(j), respectively.

Herein, specific processing when free curve L has been input in the X-direction will be now described by referring to FIGS. 10A to 10D. FIG. 10A shows free curve L which has been manually input to a document image at display portion 2. FIG. 10B shows the result of detecting a character region by character region detecting portion 8 in processing region PE designated by processing region designating portion 6. FIG. 10C shows the result of extracting at least one row region LE1 by row region extracting portion 9 based on information on each detected character region and the direction represented by the input data 36A of free curve L determined by direction determining portion 7. FIG. 10D shows the result of determining along which row region among at least one row region LE1 detected free curve L has been drawn by row determining portion 10. These results of processings may not be displayed on the screen one by one, but herein they are shown as being displayed so that user may easily determine that the processing is appropriately performed.

Curve correcting portion 5 in FIG. 1 will be now described. Curve correcting portion 5 determines how to correct and where to draw free curve L with respect to the determined row obtained by row extracting portion 4. Positional information on region data of the determined row ((s, t), (u, v)) and the input data 36A of free curve L (x(i), y(i)) (i=1 to n) are used for the process of correcting free curve L. Free curve L is typically corrected into a straight line. Herein, the case will be described in which free curve L is input in the X-direction and input data 36A is corrected so that a straight line based on free curve L is to be drawn at a position apart from determined row region data 36B by the value of variable a in the Y-direction. Note however that variable a is an arbitrary constant, and if the variable is set to a constant multiple of the line or character space in the document of image data 36D, the position of a straight line corresponding image data 36D may be designated.

Figure 11:
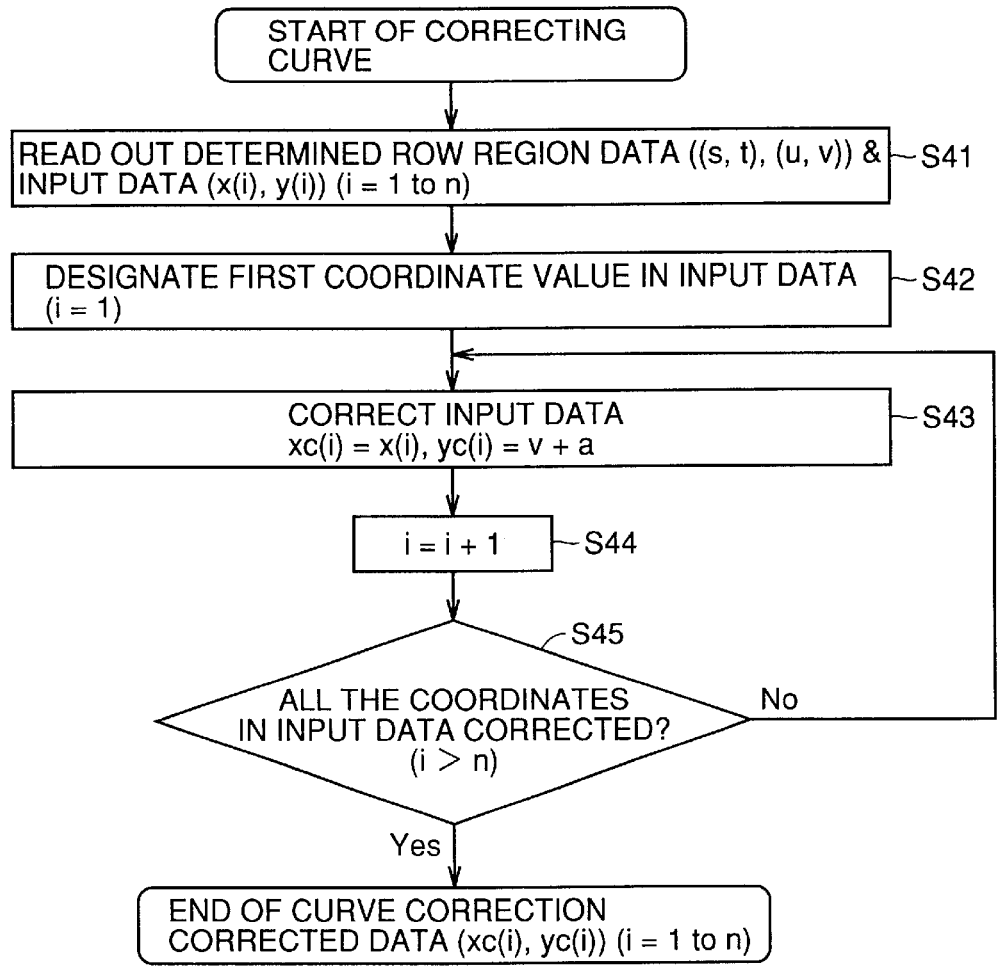
FIG. 11 is a flow chart for use in illustration of the process of correcting a free curve into a straight line using a curve correcting portion 5 in FIG. 1A.
Figure 12A:
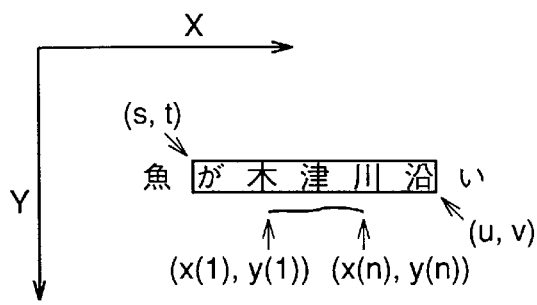
FIGS. 12A and 12B are illustrations for use in describing the process according to the process flow chart shown in FIG. 11.
Figure 12B:
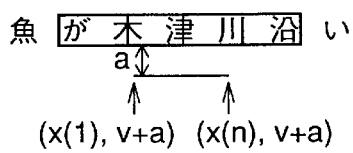

Referring to FIG. 11, the process of correcting free curve L when the curve is input in the X-direction will be described. In step S41, determined row region data 36B ((s, t), (u, v)) and the input data 36A of free curve L (x(i), y(i)) (i=1 to n) are read out from data storing portion 31D. In step S42, variable i is set to 1, whereby data in the first coordinates in input data 36A are designated. In step S43, data in the x-coordinate axis is unchanged, and the value of variable a is added to the y-coordinate value v on the lower right end of the determined row region. As a result, input data 36A is converted to corrected data 36C (xc(i), yc(i)). In step S44, data in the next coordinates in input data 36A is designated. It is determined in step S45 if data in all the coordinates in input data 36A has been processed. If the processing has not been completed, the control returns to step S43, and otherwise the process of correcting the curve is completed, and corrected data 36C (xc(i), yc(i)) (i=1 to n) is obtained and stored in data storing portion 31D. Note that corrected data 36C maybe a straight line connecting coordinates (xc(1), yc(1)) and coordinates (xc(n), yc(n)). Specific correcting process when the above described free curve L is input in the X-direction is shown in FIGS. 12A and 12B.

When free curve L is manually input in the Y-direction, the formula represented in step S43 in the flow chart in FIG. 11 needs only be changed to xc(i)=x(i)+a, yc(i)=y(i). Thus, the input data 36A of free curve L is corrected so that a straight line is drawn at a position apart from the region of the determined row by the value of variable a in the X-direction.

Figure 13A:
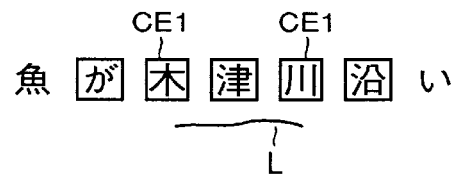
FIGS. 13A to 13C are illustrations for use in describing process of correcting corrected data using a character region.
Figure 13B:
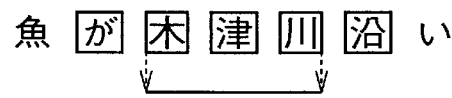
Figure 13C:

For the coordinates of the end points of the segment represented by corrected data 36C, information on each character region CE1 is used to correct the length of the segment represented by corrected data 36D by adjusting portion 53, so that the segment represented by corrected data 36C may be clearly defined. For example, as shown in FIG. 13A, in the character regions CE1 of characters "木" and "川", free curve L is drawn from the middle of character regions CE1. In such a case, it is determined if free curve L has been drawn to have a length not less than a prescribed threshold T in the direction of free curve L for each character region CE1 in the determined row, and corrected data 36C is corrected by adjusting portion 53. Note however that threshold T is an arbitrary constant and if the threshold is set to a constant multiple of the character distance in the document of the image data 36D, corrected data 36C may be corrected corresponding to image data 36C. For each character region CE1, if free curve L is drawn to have a length not less than threshold T in the direction of free curve L, it is determined that free curve L has been drawn along characters in character region CE1, and corrected data 36C is corrected so that a straight line is to be drawn along the entire range of that character region CE1 in the X-direction (see FIG. 13B). Corrected data 36C is corrected so that the end points of the straight line are positioned between a certain character region CE1 and an adjacent character region CE1 (see FIG. 13C). Thus, using information on character region CE1 in a determined row corresponding to free curve L, the length of a straight line represented by corrected data 36C of free curve L may be corrected.

Curve correcting portion 5 has a ruby row recognizing portion 50. Ruby identifying portion 50 compares the width in the Y-direction of row region LE1 (or column region) determined by row determining portion 4 to that of another row region LE1 (or column region), and if the width is not more than a prescribed threshold U, the row is identified as rubies including kana placed along Chinese characters. Note however that threshold U is an arbitrary constant and if the threshold is set to a constant multiple of the character distance or row distance in the document of image data 36D, the process of recognizing a ruby row corresponding to image data 36D may be performed.

Figure 14:
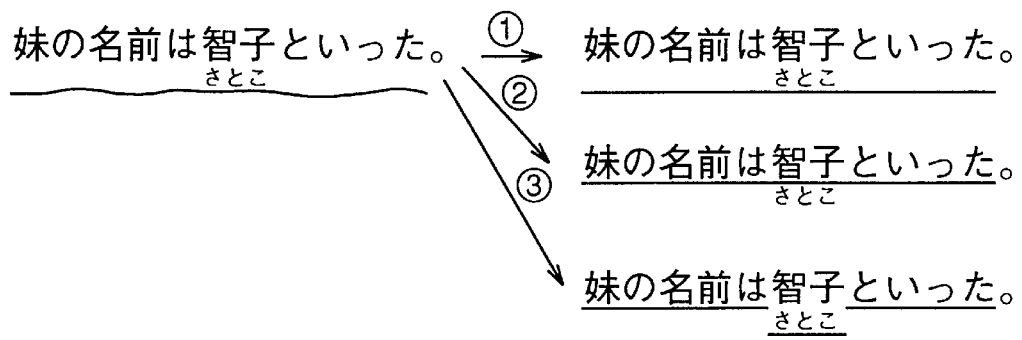
FIG. 14 is an illustration for use in describing process to perform by a curve correcting portion 5 when a free curve is input to a document image including a character with a ruby is input in FIG. 1A.

FIG. 14 shows the process of correcting a curve when a line portion is placed along a ruby row for a character string including a character with a ruby. Herein, any of the steps in the following (1) to (3) is selected to correct free curve L.

(1) A line portion is drawn along the row of the ruby (arrow ① in FIG. 14).

(2) A row determining process is performed again, while ignoring the ruby row to determine a new determined row, and a segment is drawn based on the determined row (arrow ② in FIG. 14). More specifically, the row thus newly determined is a row consisting of characters with rubies. Then, a segment is placed along the new determined row.

(3) Similarly to the step in the above (2), a row determining process is once again performed to determine a new determined row, and a segment is placed along the determined row (see arrow ③ in FIG. 14). More specifically, in the newly determined row, a segment is placed along rubies for ruby-attached characters and along that newly determined row for characters without ruby.

In the above process, free curve L in solid line is corrected into a straight line along the determined row, and the process for free curve L of other kinds than the solid line will be described.

Figure 15:
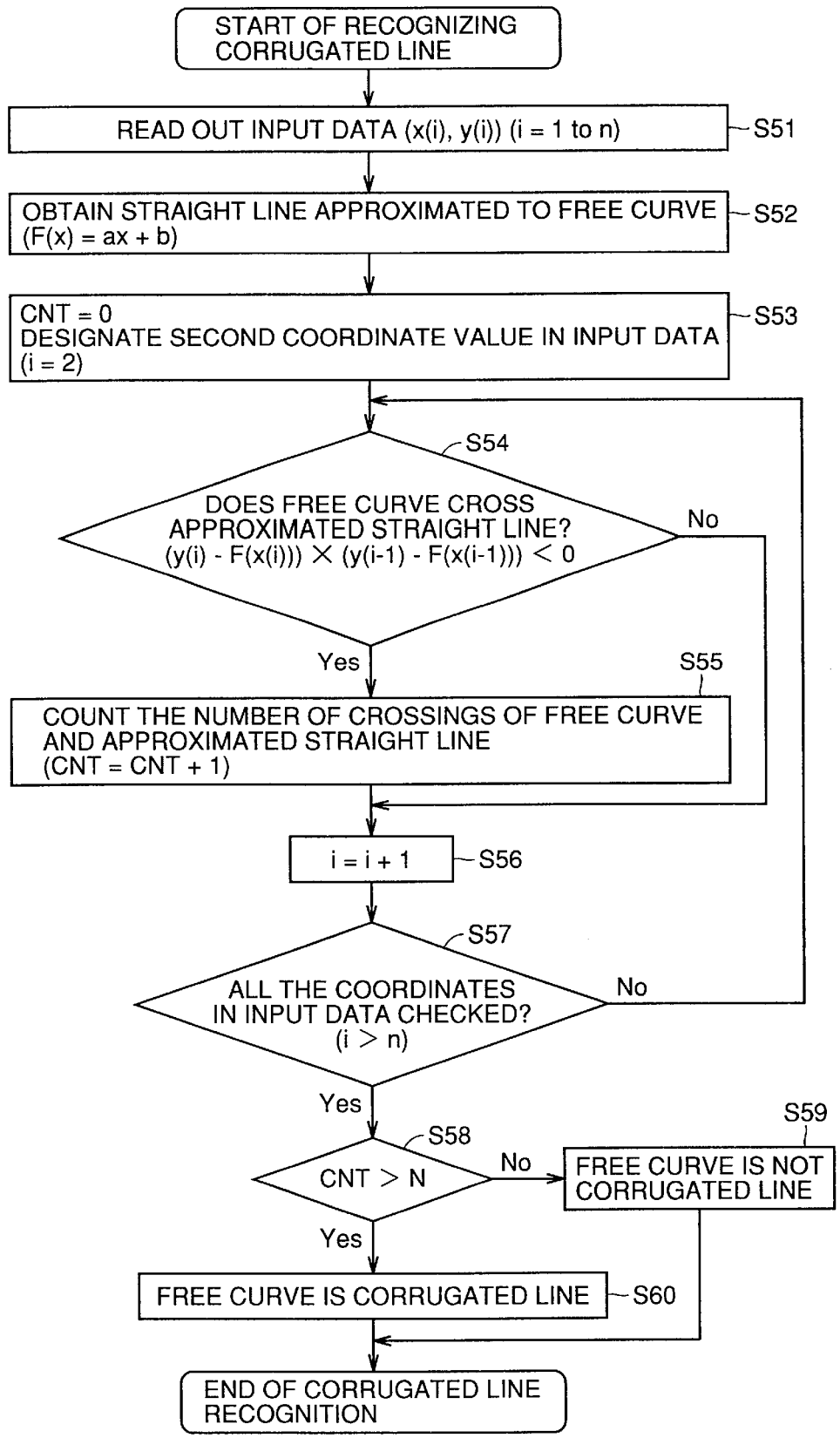
FIG. 15 is a flow chart for use in illustration of process by a corrugated line recognizing portion 51 in FIG. 1A.

The process performed by curve correcting portion 5 having a corrugated line recognizing portion 51 to identify whether free curve input in the X-direction is a corrugated line or not will be now described by referring to FIG. 15. In step S51 in FIG. 15, the input data 36A of free curve L (x(i), y(i)) (i=1 to n) is read out from data storing portion 31D. In step S52, read out input data 36A is processed using the method of least squares and converted into straight line data approximated to manually input free curve L. The straight line data obtained by the conversion is defined as F(x)=ax+b. In step S53, a variable CNT is set to 0. Variable CNT represents the number of crossings of free curve L and the straight line approximated to free curve L. Then, variable i is set to 2, whereby the second coordinates in the input data 36A of free curve L are designated. It is determined in step S54 if the straight line connecting the i-th coordinates and the i−1-th coordinates in the input data 36A of free curve L cross the straight line approximated to free curve L. At this time, if it is determined that there is a crossing, the control proceeds to step S55, and otherwise variable i is incremented by 1 in step S56, whereby the next coordinates in input data 36A are designated.

In step S55, the number of crossings of free curve L and the straight line approximated thereto is counted as variable CNT is incremented, and the control proceeds to step S56. It is determined in step S57 if the data of all the coordinates in input data 36A has been processed, and if the processing has not been completed, the control returns to step S54.

It is determined in step S58 if the value of variable CNT is greater than a prescribed threshold N, and if the value is greater than the threshold, then it is determined in step S60 that free curve L is a corrugated line, and otherwise it is determined in step S59 that free curve L is not a corrugated line, thus ending the processing. Note however that threshold N is an arbitrary constant, and if this threshold N is too large, free curve L is unlikely to be recognized as a corrugated line, while if this threshold is too small, the curve is more likely to be recognized as a corrugated line. If free curve L is manually input in the Y-direction, the formula in step S52 in the flow chart in FIG. 15 is replaced by $F(y)=ay+b$, and the determining formula in step S54 is replaced by $((x(i)-F(y(i)))\times x(i-1)-F(y(i-1)))<0$, and the same processing is performed.

If free curve L is identified as a corrugated line by corrugated line recognizing portion 51, free curve L is corrected according to a selected one of the following steps: (1) free curve L is corrected into a normal corrugated line, (2) free curve L is corrected into a corrugated line having a amplitude in a prescribed range and an irregular cycle, and (3) free curve L is corrected into a corrugated line having an amplitude in a prescribed range based on the amplitude of free curve L and an irregular cycle. Herein, the normal corrugated line in the step (1) refers to for example a sine wave, a corrugated line having constant wavelength and amplitude. An example of the method of correction in (2) is as follows. When free curve L is manually input in the X-direction, the input data 36A of free curve L is corrected using $x(i)=x(i)$ and $y(i)=y(i)+T(i)\times R$ (wherein T(i) is a constant multiple of y(i), and variable R is a random function). An example of the method of correcting in the process (3) is as follows. When free curve L is manually input in the X-direction, the maximum and minimum values of input data 36A in the Y-direction are variables MAX and MIN, respectively and $x(i)=x(i)$ and $y(i)=y(i)+T(i)\times R(i)$ holds (wherein variable T(i) is a constant variable of variable y(i), and variable R(i) is a random function based on the amplitude of free curve L). As R(i) is defined as $R(i)=(F(x(i))-MEAN)/(MAX-MIN)$ (wherein $MEAN=(MAX-MIN)/2$) and free curve L is corrected into a corrugated line accordingly.

The processing when free curve L is of a different kind from the solid line, a broken line for example, will be now described. Curve correcting portion 5 has a broken line recognizing portion 52 to identify whether free curve L manually input in the X-direction is a broken line.

Figure 16:
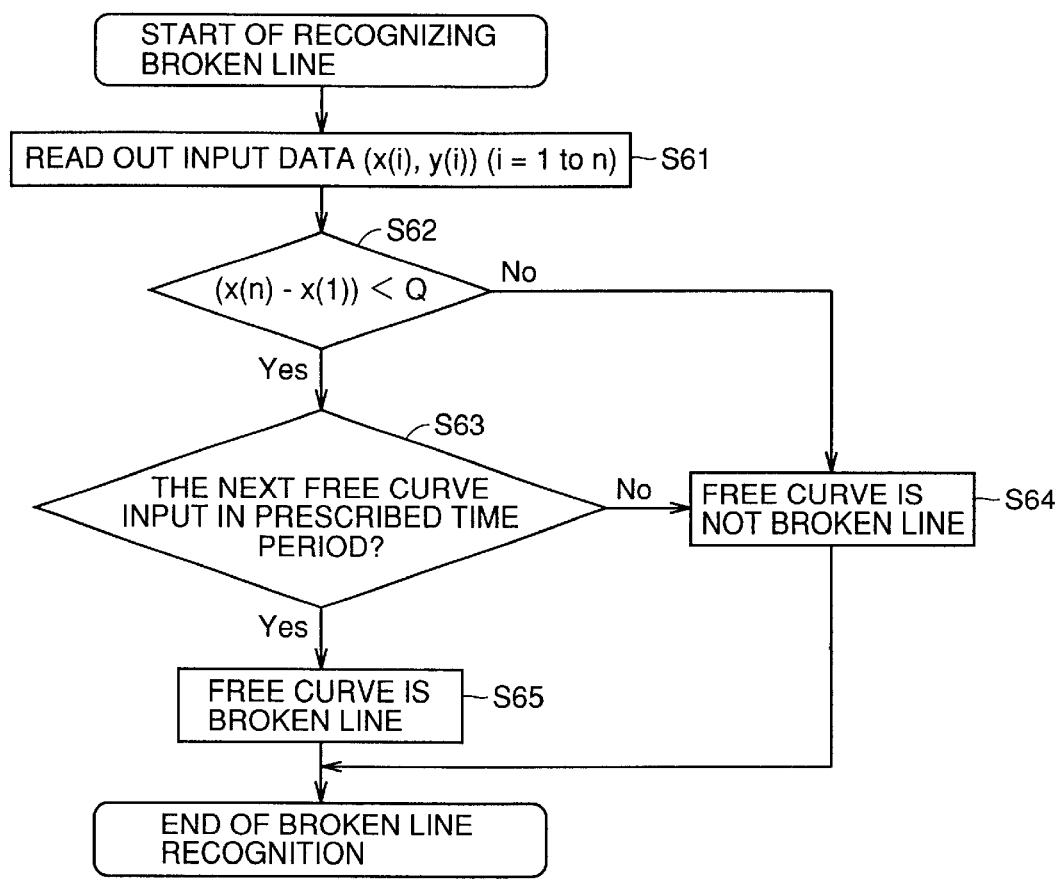
FIG. 16 is a flow chart for use in illustration of process by a broken line recognizing portion 52 in FIG. 1A.

The process of broken line recognizing portion 52 will be now described in conjunction with the flow chart in FIG. 16.

In step S 61 in FIG. 16, the input data 36A of free curve L(x(i), y(i)) (i=1 to n) is read out from data storing portion 31D. It is determined in step S62, the length (x(n)−x(1)) in the direction in which free curve L is input is smaller than a prescribed value Q, and if the length is smaller the control proceeds to the next step S63. Otherwise, it is determined that free curve L is not a broken line and the process of recognizing a broken line ends. Note however that threshold Q is an arbitrary constant and if the threshold is set to a constant multiple of the character distance in the document of image data 36D, the process of recognizing a broken line corresponding to image data 36D may be performed.

In step S63, after free curve L has been input, it is determined if the next free curve L has been input in a prescribed time period, and if there has been such input, it is determined in step S65 that the curve is a broken line, and otherwise, it is determined in step S64 that the curve is not a broken line, and the process of recognizing a broken line ends. If the document image processing apparatus has broken line recognizing portion 52, the input data 36A of free curve L includes time data representing the time of input of the data, and therefore the step of determining in step S63 is performed based on the time data. Note if free curve L is input in the Y-direction, the expression in step S62 in FIG. 16 is replaced by $(y(n)-y(1))<Q$, and the same processing may be performed.

If broken line recognizing portion 52 identifies free curve L as a broken line, it is assumed the broken line is formed of p line portions. In this case, each piece of input data 36A of the p line portions is defined as (x(k) (i), y (k) (i)) (k=1 to p) (i=1 to n (p)) (wherein variable n(k) is the total number of coordinates to represent each line portion forming the broken line). Then, any of the following steps is selected and executed: (1) free curve L is corrected into a normal broken line, (2) free curve L is corrected into such a broken line that the length of each line portion of the broken line or the distance between the line portions is irregular in a prescribed range and (3) free curve L is formed into a broken line with irregularity using the length of each line portion or the distance between the line portions. The irregular broken line in process (1) is such a broken line that the length of each line portion constituting the broken line and the distance between the line portions for example is constant and that the line portions are arranged on a single straight line. An example of correcting step (2) is as follows. When free curve L is input in the X-direction, the input data 36A of free curve L is corrected using the following expression. More specifically, if $x(k)$ $(i)=x(k)$ $(i)$ (wherein $x(k)(i)-x(k)$ $(1) \leq P$), $x(k)$ $(i)=x(k)$ $(1)+P$ (wherein $x(k)$ $(i)-x(k)$ $(1)>P$), and $y(k)$ $(i)=(k)+a$ (wherein variable v(k) is the maximum coordinates of the determined row of the line portion k in the Y-direction) are used to correct input data 36A. Note however that variable P described above is an arbitrary constant, and if a constant multiple of the distance between characters in the document of image data 36D, a broken line corresponding to image data 36D can be identified.

When the distance between the line portions is too great, the arrangement of corrected input data 36A is increased and new line portions may be added.

In the above step (3), the processes by row extracting portion 4 and curve correcting portion 5 are applied to each of the line portions of the broken line. More specifically, the corresponding value of each coordinate of corrected data 36C in the direction in which free curve L has been input is equal to the corresponding value of original input data 36A, and an irregular broken line using input data 36A is produced. For example, if free curve L is input in the X-direction, the input data 36A of free curve L is converted into corrected data 36C defined as $x(k)$ $(i)=x(k)$ $(i)$ and $y(k)$ $(i)=v(k)+a$.

Figure 17A:
FIGS. 17A to 17C are illustrations for use in describing process by an adjusting portion 53 in FIG. 1A.
Figure 17B:
Figure 17C:

In curve correcting portion 5, if no character region is present around corrected data 36C, part of corrected data 36C is deleted by adjusting portion 53, and the length of the straight line represented by corrected data 36C is adjusted. FIGS. 17A to 17C show the process when one end of free curve L is present in the part of processing region PE (not shown) in which there is no character region. If free curve L is drawn in a part with no character region (see FIGS. 17A and 17B), unnecessary data in the determined direction in corrected data 36C is deleted based on the position of character region CE1 at one end of the determined row (see FIG. 17C).

Second Embodiment

A second embodiment of the present invention will be now described. In the above first embodiment, once free curve L has been manually input, the process in and after step S3 in FIG. 2 are immediately performed, in other words, sequential processing is employed. The end of the input of free curve L is detected by a well known technique. More specifically, after free curve L has been input, the passage of a prescribed time period is measured using a timer which is now shown, and if the data of the next free curve L is not obtained after the passage of the prescribed time period, the end of input of free curve L is detected accordingly.

In the second embodiment, corrected data 36C and image data 36D obtained by the method according to the first embodiment have been stored in data storing portion 31D and displayed at display portion 2, a new free curve L is input for the same image data 36D.

The configuration of this embodiment is similar to that of the first embodiment, but the second embodiment functions as follows. More specifically, as shown in FIG. 1A, curve correcting portion 5 includes a corrected data presence/absence determining portion 54 and a position correcting portion 55 according to the second embodiment. When a free curve L is input to a determined row represented by determined row region data 36B ((s, t), (u, v)), corrected data presence/absence determining portion 54 determines if a corrected free curve has been drawn along the determined row. If corrected data presence/absence determining portion 54 determines an already corrected free curve has been drawn along the determined row, position correcting portion 55 corrects the position of the presently input free curve L or the corrected free curve which has been already drawn along the determined row, such that these curves to be continues.

Figure 18:
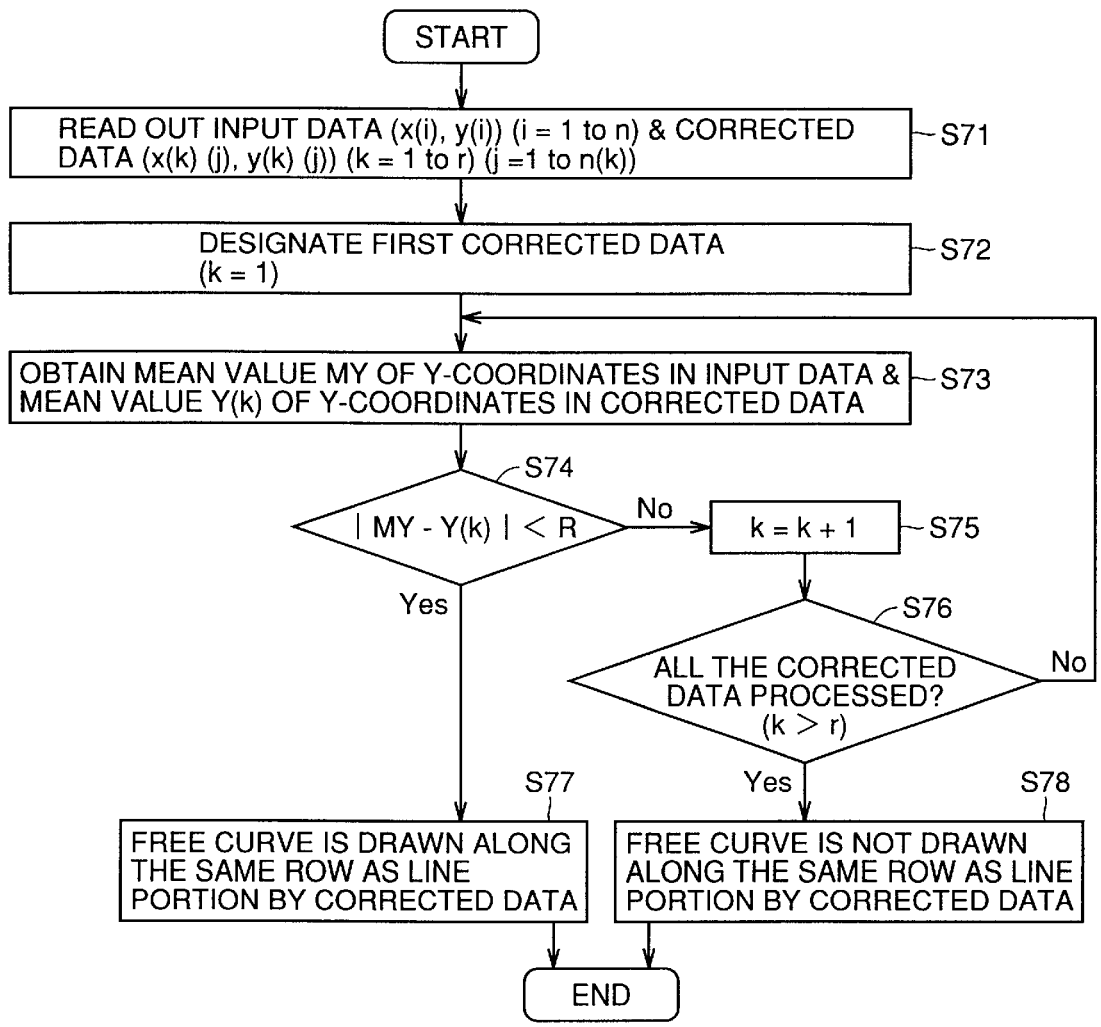
FIG. 18 is a flow chart for use in illustration of process by a corrected data presence/absence determining portion 54 in FIG. 1A.
Figure 19A:
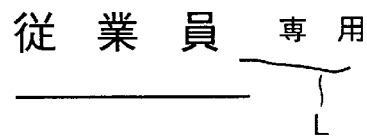
FIGS. 19A to 19E are flow charts for use in illustration of process by a position correcting portion 55 in FIG. 1A.
Figure 19B:
Figure 19C:
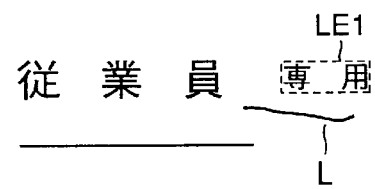
Figure 19D:
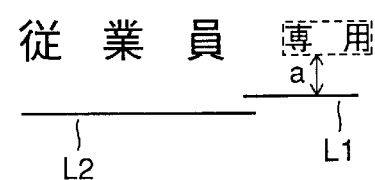
Figure 19E:
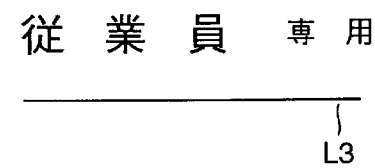

The process by corrected data presence/absence determining portion 54 of determining whether at least one piece of corrected data 36C corresponding to a determined row along which free curve L has been input has been registered in data storing portion 31D will be now described in conjunction with the flow chart in FIG. 18. Note that the free curve L has been input along the determined row in the X-direction. Let us assume that at least one piece of corrected data 36C has been registered in data storing portion 31D.

In step S71 in FIG. 18, the input data 36A of the manually input free curve L (x(i), y(i)) (i=1 to n), and at least one piece of corrected data 36C (x(i) (j), y(k) (j)) (k=1 to r) (j=1 to n(k)) (wherein variable n(k) is the total number of coordinate data constituting the k-th corrected data 36C) are read out from data storing portion 31D. In step S72, variable k is set to 1, whereby the first corrected data 36C is designated among at least one piece of corrected data 36C read out. In step S73, the mean value MY(=(y(1)+y(2)+ . . . +y(n)/n) of the y-coordinates of the input data 36A of free curve L and the mean value Y(k) of the y-coordinates of the designated corrected data 36C (=(y(k) (1)+y(k) (2)+ . . . +y(k) (n (k))/n (k)) are provided. Herein, the mean values of the y-coordinates are obtained because the designated corrected data 36C may be the data of a corrugated line or broken line.

If it is determined in step S74 that the value of |MY−Y(k)| is smaller than a prescribed value R, it is determined in step S77 in that free curve L is drawn along the same row as the line portion represented by designated corrected data 36C, thus completing the process. Meanwhile, if the value of |MY−Y(k)| is not smaller than the prescribed value R, variable k is incremented by 1 in step S75, whereby the next corrected data 36C is designated. Note however that the threshold value R is an arbitrary constant and if a constant multiple of inter-character or inter-row distance in the document represented by image data 36D is set for the threshold R, the process corresponding to image data 36D may be performed.

In step S76, in order to detect corrected data 36C to satisfy the condition in step S74, it is determined if all the corrected data 36C read out in step S71 has been processed, in other words, it is determined if k>r is established. If corrected data 36C to satisfy the condition in step S74 is not detected, it is determined in step S78 that no line portion has been already drawn along the same row as free curve L, thus completing the process. Note that if free curve L is input in the Y-direction, variable MY is replaced by variable MX in steps S73 and S74 in FIG. 18 while variable Y(k) is replaced by variable X(k) and the process is similarly performed.

The display processing when free curve L is placed along the same row along which a line portion has been already drawn based on corrected data 36C in data storing portion 31D will be now described in conjunction with FIGS. 19A to 19E. When the user manually inputs free curve L using a line input portion 3 to the document of image data 36D previously displayed on display portion 2 (see FIG. 19A), processing region PE is designated and at least one character region CE1 is detected (see FIG. 19B), and a row region LE1 is extracted (see FIG. 19C). Free curve L is subjected to a curve correcting processing such that a straight line L1 is drawn at a position distance apart from a determined row represented by extracted row region LE1 (see FIG. 19D). At this time, it is determined by corrected data presence/absence determining portion 54 that line portion L2 by corrected data 36C has been already drawn along the determined row, and therefore the corrected data 36C of free curve L is corrected by position correcting portion 55 such that line portions L1 and L2 will form a single straight line L3 (see FIG. 19E). More specifically, in position correcting portion 55, the corrected data 36C of a line portion positioned near the determined row (corrected data 36C corresponding to line portion L1 "specifically drawn" in FIG. 19D) is corrected to be consecutive with the corrected data 36C of a line portion positioned away from the determined row (the corrected data 36C of line portion L2 in FIG. 19D). As a result, the position of line portion L1 is corrected along the determined row, and straight line L3 will be drawn (see FIG. 19E).

If free curve L and an already drawn line portion along the determined row are corrugated lines, the corrected data 36C of free curve L needs only be subjected to the process of designating a new position as described above. Otherwise, the data may be processed to be consecutive with the corrected data 36C already registered in the data representing the end point of free curve L and to be shifted in phase such that the differential values are equal or the arrangement is increased/decreased to add/delete information on line portions such that the data may be continuous with the corrected data 36C of the already drawn line portion.

Third Embodiment

In the first and second embodiments, free curve L is manually input one after another and processed. In the third embodiment, a plurality of input free curves L are processed at a time. In the third embodiment, if a batch processing is selected by the user as the input mode of free curve L, and a plurality of arbitrary free curves L are manually input, a batch processing button or the like (not shown) in line input portion 3 is operated and the following process is performed.

The configuration of a document image processing apparatus according to the third embodiment is the same as that of the first embodiment, but has new functions as follows. More specifically, when q free curves L are input from line input portion 3, input data 36A for each free curve L is defined as (x(k) (i), y(k) (i)) (k−1~q) (i=1~n (k)) (wherein variable n(k) is the total number of coordinates constituting the k-th free curve L). The component of corresponding free curve L is set for input data 36A in the ascending order.

Figure 22:
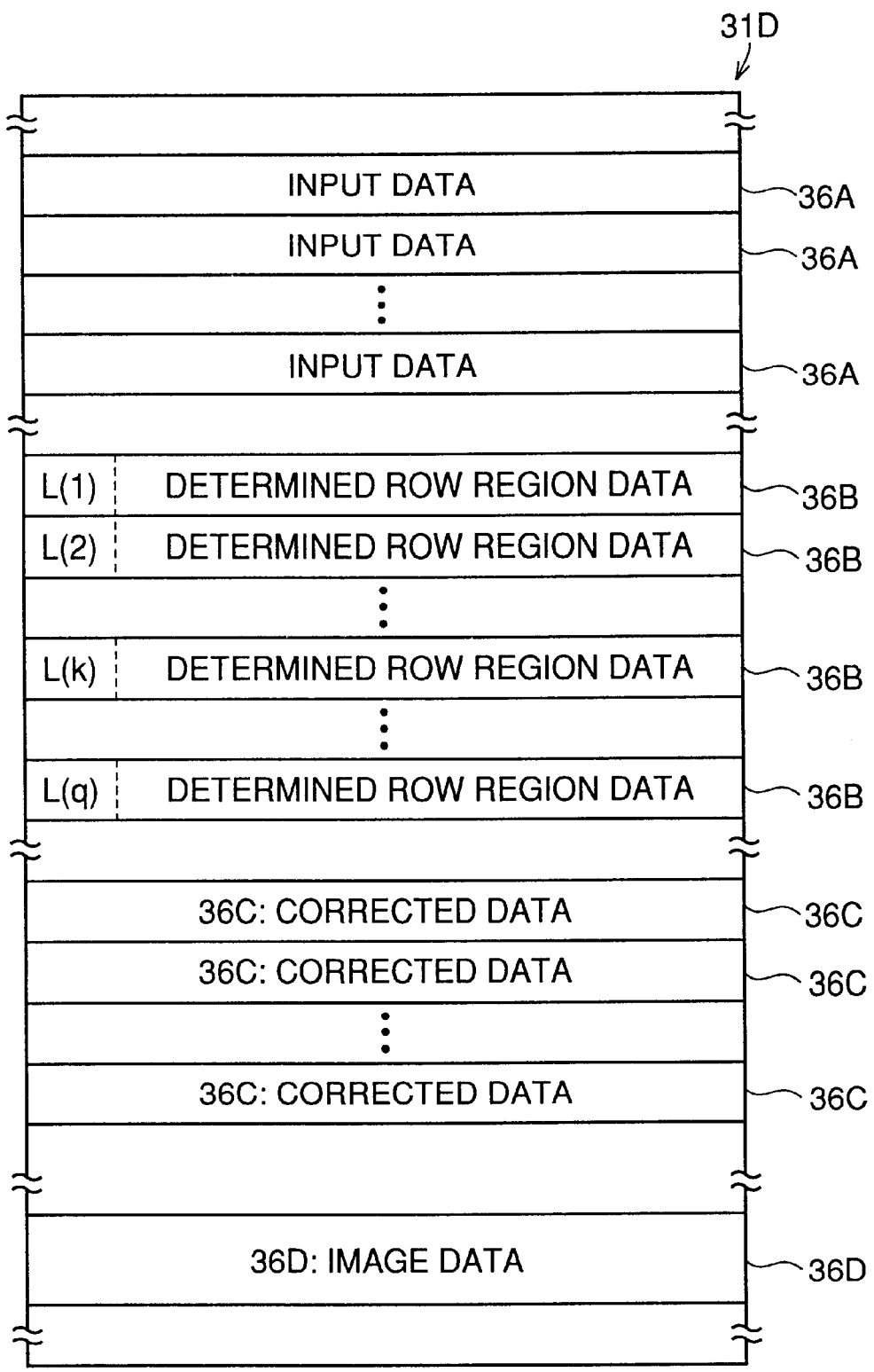
FIG. 22 is an illustration for use in describing an example of content in a data storing portion 31D applied in a third embodiment of the present invention.

Row extracting portion 4 processes the q free curves L, and therefore determined row region data 36B ((s(k), t(k)), (u(k), v(k)) (k=1 to q) is obtained and stored in data storing portion 3 1D. Note however that variables (s(k), t(k)) represent the coordinates at the upper left end of the determined row region (rectangular region) and variables (u(k), v (k)) represent coordinates at the lower right end of the determined row region (rectangular region). Determined row region data 36B corresponding to the determined row obtained in row determining portion 10 is allocated with a label value L (k)=k (k=1 to q) uniquely specifying the data in data storing portion 31D as shown in FIG. 22.

Curve correcting portion 5 has a multiple free curve presence/absence determining portion 56 and a multiple line position correcting portion 57 according to the third embodiment. Multiple free curve presence/absence determining portion 56 determines if a plurality of free curves L are placed along the same determined row, in other words for the same determined row region data 36B ((s(k), t(k)), (u(k), v(k)) (k=1 to q). Multiple line position correcting portion 57 corrects a plurality of pieces of corrected data 36C corresponding to a plurality of free curves L drawn along the same row to have continuity if it is determined by multiple free curve presence/absence determining portion 56 that the plurality of free curves L are drawn along the same determined row.

Figure 20:
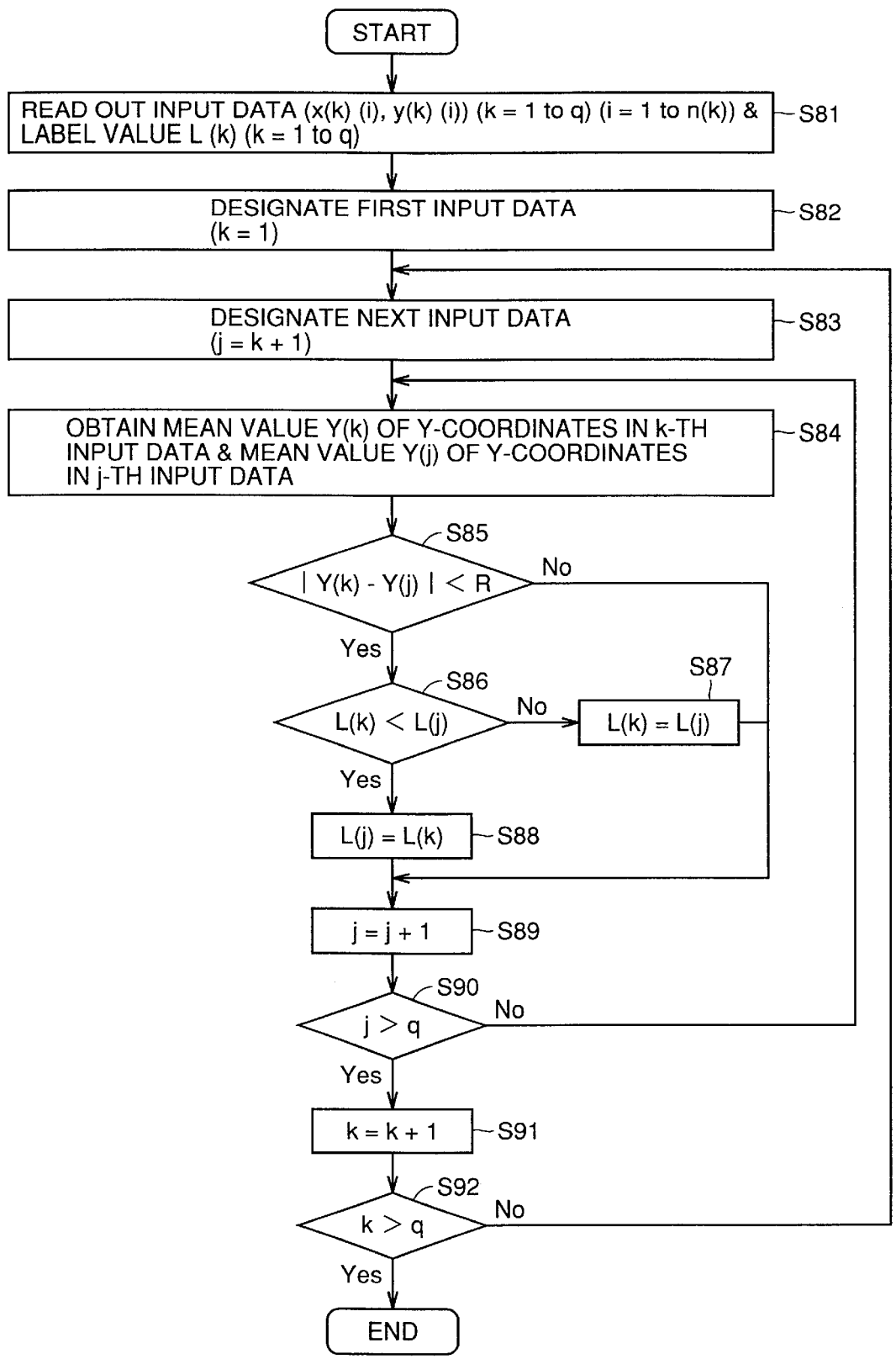
FIG. 20 is a flow chart for use in illustration of a multiple free curve presence/absence determining portion 56 in FIG. 1A.
Figures 21A, 21B, 21C, 21D, 21E:
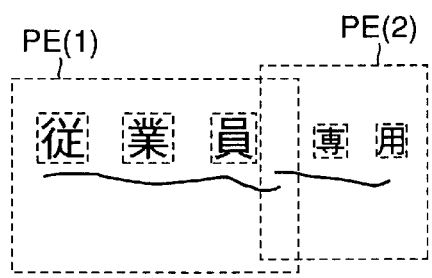
FIGS. 21A to 21E are illustrations for use in describing an example of process by a multiple line portion position correcting portion 57 in FIG. 1A.

Herein, in multiple free curve presence/absence determining portion 56, the process when a plurality of free curves L are manually input in the X-direction will be now described in conjunction with the flow chart in FIG. 20.

In step S81, a plurality of pieces of input data 36A (x(k) (i), y(k) (i)) for the plurality of free curves L and label value L (k) (k=1 to q) (i=1 to n (k))are read out from data storing portion 31D. In step S82, variable k is set to 1, and among the plurality of pieces of input data 36A read out, the first input data 36A is designated. In step S38, variable j is set to k+1, and the next input data 36A is designated. In step S84, the average value of the y-coordinates of the k-the input data 36A, Y(k) (=(y(k) (1)+y(k) (2)+ . . . +y(k) (n(k))/n(k)) and the mean value of the y-coordinates of the j-th input data 36A, Y(j) (=(y(j) (1)+y(j) (2)+ . . . +y(j) (n(j)/n(j))) are obtained.

If it is determined in step S85 that the value of |Y(k)−Y(j)| is smaller than prescribed threshold R, label value (k) and label value L(j) are compared in step S86, and based on the result of comparison, the larger label value is processed and changed to the smaller label value in steps in S87 and S88, respectively. Note however that threshold R is an arbitrary constant and if a constant multiple of the inter-character or inter-row distance in the document of image data 36D is set for threshold R, the process corresponding to image data 36D may be performed.

In step S89, variable j is incremented, whereby the next input data 36A is designated. It is determined in step S90 if j>q holds, and the process from steps S84 to S88 is repeated until j>q is established. In step S91, variable k is incremented by 1, whereby the next input data 36A is designated. Then, until k>q is determined in step S92, the process from steps S83 to S91 is repeated. Thus, when all the combinations of the q free curves L have been subjected to processing, determined row region data 36B for each of all the free curves L corresponding to the same determined row will have the same label value L (k).

Note that if free curve L is input in the Y-direction, variable y is replaced by variable x and variable Y is replaced by variable X in steps S84 and S85 in FIG. 20, and the same processing may be performed.

As the result of foregoing process, if a plurality of pieces of determined row region data 36B having the same label value L (k) are registered in data storing portion 31D in FIG. 22, in other words, if it is determined that a plurality of free curves L have been drawn along the same determined row, as shown in FIGS. 21A to 21E, the corrected data 36C of the plurality of free curves L is corrected by multiple line position correcting portion 57 for display as follows. More specifically, when two free curves L(1) and L(2) are manually input from line input portion 3 (see FIG. 21A), processing regions PE(1) and PE(2) are designated, and at least one character region CE1 is detected for each of the processing regions (see FIG. 21B), so that row regions LE1(1) and LE1(2) are extracted as determined rows (see FIG. 21C). The corrected data 36C of free curves L(1) and L(2) is corrected so that straight lines L1 and L2 will be drawn along a position distance a apart from each determined row by curve correcting portion 5 (see FIG. 21D). At this time, since it is determined that free curves L(1) and L(2) are drawn along the same determined row, multiple line position correcting portion 57 corrects the two pieces of corrected data 36C so that these two free curves have continuity. More specifically, the corrected data 36C of one of straight lines L1 and L2 closer to the determined row (the corrected data 36C of straight line L2 drawn along the character string "専用" in FIG. 21D) is corrected to be continuous with the corrected data 36C further from the determined row (the corrected data 36C of straight line L1 drawn along the character string "従業員" in FIG. 21D) (see FIG. 21E).

If the plurality of free curves L input along the same determined row are corrugated lines, the following process is necessary in order that line portions by the respective corrected data 36C of the plurality of free curves L constitute a single continuous line portion. More specifically, in addition to the process of designating the position of corrected data 36C corresponding to each free curve L to have continuity, the following process is performed. For example, respective corrected data 36C may be corrected to be shifted in phase so that each corrected data 36C have continuity at corresponding ends of the line portion and the differential values are equal. The arrangement of corrected data 36C may be increased/reduced to add/remove a line portion so that the plurality of pieces of corrected data 36C have continuity.

Note that in the above embodiments, data by a line portion manually input in the document image displayed at display portion 2 is stored as separate data corresponding to image data 36D as shown in FIG. 31D.

Various processings including the process shown in the flow chart in connection with the embodiments described above are implemented by CPU 30 reading out and executing document image processing programs previously stored in program storing portion 31P. These programs are stored in a recording medium readable by CPU 30 such as program storing portion 31P. As the recording medium, an external recording medium 35 may be employed. In that case, as external recording medium 35 is set in an external recording medium driver 34, a program read out from external recording medium 35 is loaded into a prescribed area including internal program storing portion 31P and then may be read out by CPU 30 for execution. The program for loading is pre-stored in a storage region (not shown) of the apparatus main body.

The program storing medium may be a recording medium formed separately from the main body of the apparatus. More specifically, the medium may be a tape such as magnetic tape and cassette tape, a magnetic disc such as flexible disc and hard disc, a disc such as CD-ROM, MO, MD and an optical disc such as DVD, a card such as IC card (including a memory card) and optical card, or a recording medium including a semiconductor memory such as mask ROM, EPROM, EEPROM and flash ROM.

The document image processing apparatus as shown in FIG. 1B may be connected with communication network 33 including the Internet, and therefore it may be a medium which carries an image processing program to download a document image processing program through communication network 33.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A document image processing apparatus, comprising:
  a display portion for displaying a document image wherein the document image is a bitmap image;
  a line input portion for inputting a free curve line portion manually input along the image of an arbitrary character string in the document image displayed at said display portion; and
  a processing portion for processing the free curve line portion manually input by said line input portion,
  said processing portion, operating on the bitmap image, including at least one of a first processing portion and a second processing portion, said first processing portion including,
  direction determining means for determining the direction of the manually input free curve line portion, wherein the direction of the manually input free curve line portion may be horizontal or vertical;
  row extracting means based on a result of projecting said document image in a direction different from a direction of said horizontal or vertical directions, as determined by said direction determining means, to extract in the region of said document image the region of a row including the image of said arbitrary character string; and
  line correcting means for correcting said manually input free curve line portion into a normal line portion drawn along the region of said row extracted by said row extracting means, adjusting a distance between said free curve line portion corrected and said extracted row and displaying at said display portion of said free curve portion adjusted,
  said second processing portion including,
  direction determining means for determining the direction of the manually input free curve line portion, wherein the direction of the manually input free curve line portion may be horizontal or vertical;
  row extracting means extracting in the region of a document image the region of a row including the image of said arbitrary character string, as based on a direction determined by said direction determining means and an image of at least one character in said document image;
  means projecting said document image in a direction identical to the direction determined by said direction determining means, and based on a result of said projecting to extract a character respectively; and
  line correcting means for correcting said free curve line portion into a normal line portion drawn along the region of said row extracted by said row extracting means, determining start and end points of said free curve line portion corrected, as based on said extracted character respectively, and displaying said free curve line portion at said display portion, thereby displaying the normal line portion at said display portion, wherein
  said line correcting means has ruby row recognizing means for recognizing if the region of said row extracted by said row extracting means corresponds to a row of rubies including kana given alongside Chinese characters, and corrects said manually input free curve line portion into said normal line portion drawn along the region of said row of rubies when the region of said row is recognized as corresponding to said row of rubies by said ruby row recognizing means.

2. The document image processing apparatus according to claim 1, wherein
  said processing portion further includes processing region designating means for designating a processing region for processing said manually input free curve line portion in the region of said document image.

3. The document image processing apparatus according to claim 1, wherein
  said row extracting means includes,
  candidate region extracting means for extracting at least one candidate region to be a candidate for the region of said row based on the direction determined by said direction determining means and at least one character image region in the region of said document image, and
  row region determining means for determining the region of said row including said arbitrary character string in at least one said candidate region extracted by said candidate region extracting means.

4. The document image processing apparatus according to claim 1, wherein
  said normal line portion is a straight line.

5. The document image processing apparatus according to claim 1, wherein
  said line correcting means includes,
  line kind identifying means for identifying the line kind of said manually input free curve line portion, and corrects said manually input free curve line portion into said normal line portion according to said line kind identified by said line kind identifying means.

6. The document image processing apparatus according to claim 5, wherein
  the line kind of said normal line portion coincides with said line kind of said manually input free curve line portion identified by said line kind identifying means.

7. The document image processing apparatus according to claim 1, wherein
said line correcting means has adjusting means for adjusting the length of said normal line portion into an optimum length based on the region of at least one character in the region of said row extracted by said row extracting means.

8. The document image processing apparatus according to claim 1, wherein
said line correcting means has normal line portion position correcting means, when at least one said normal line portion has been already drawn along the region of said row extracted by said row extracting means, for correcting the position of said normal line portion corresponding to said manually input free curve line portion or at least one said normal line portion already drawn along the region of said row, so that said normal line portion corresponding to said manually input free curve line portion and said at least one normal line portion already drawn along the region of said row are continuously drawn.

9. The document image processing apparatus according to claim 8, wherein
said correcting means further includes normal line presence/absence determining means for determining whether at least one said normal line portion has already been drawn along the region of said row extracted by said row extracting means.

10. The document image processing apparatus according to claim 1, wherein
said correcting means has manually input free curve line position correcting means for adjusting the position of at least one said normal line portion corresponding to at least one said manually input free curve line portion, thereby correcting at least one said normal line portion into a single continuous line portion, when at least one said manually input free curve line portion is input on the region of said row extracted by said row extracting means.

11. The document image processing apparatus according to claim 10, wherein
said line correcting means further has manually input free curve line presence/absence determining means for determining the input of at least one said manually input free curve line portion on the region of said row extracted by said row extracting means.

12. The document image processing apparatus according to claim 1, wherein
said document is described in one of two directions, horizontal and vertical directions in said document image,
said direction determining means determines which direction of the two directions said manually input free curve line portion is along.

13. A method of processing a document image, comprising the steps of:
displaying a document image wherein the document image is a bitmap image;
inputting a manually drawn free curve line portion along an image of an arbitrary character string in said document image displayed by said displaying step; and
processing the manually drawn free curve line portion input by said inputting step,
said processing step, operating on the bitmap image, including at least one of a first processing step and a second processing step, said first processing step including,
determining a direction of said manually drawn free curve line portion, wherein the direction of the manually input free curve line portion may be horizontal or vertical;
extracting the region of a row based on a result of projecting said document image in a direction different from a direction of said horizontal or vertical directions, as determined by said direction determining means, to extract in the region of said document image the region of a row including the image of said arbitrary character string; and
correcting said manually drawn free curve line portion into a normal line portion placed along the region of said row extracted by said extracting step, adjusting a distance between said free curve line portion corrected and said extracted row and displaying at said display portion of said free curve portion adjusted,
said second processing portion including,
determining the direction of the manually input free curve line portion, wherein the direction of the manually input free curve line portion may be horizontal or vertical;
extracting in the region of a document image the region of a row including the image of said arbitrary character string, as based on a direction determined by said direction determining means and an image of at least one character in said document image;
projecting said document image in a direction identical to the direction determined by said direction determining step, and based on a result of said projecting to extract a character respectively; and
correcting said free curve line portion into a normal line portion drawn along the region of said row extracted by said row extracting step, determining start and end points of said free curve line portion corrected, as based on said extracted character respectively, and displaying said free curve line portion at said display portion, thereby displaying the normal line portion, wherein
said line correcting means has ruby row recognizing means for recognizing if the region of said row extracted by said row extracting means corresponds to a row of rubies including kana qiven alongside Chinese characters, and correct said manually input free curve line portion into said normal line portion drawn along the region of said row of rubies when the region of said row is recognized as corresponding to said row of rubies by said ruby row recognizing means.

14. A computer-readable recording medium recorded with a document image processing program for executing with the computer a method of processing a document image, comprising the steps of:
displaying a document image wherein the document image is a bitmap image;
inputting a manually drawn free curve line portion along an image of an arbitrary character string in said document image displayed by said displaying step; and
processing the manually drawn free curve line portion input by said inputting step,
said processing step, operating on the bitmap image, including at least one of a first processing step and a second processing step, said first processing step including,
determining a direction of said manually drawn free curve line portion, wherein the direction of the manually input free curve line portion may be horizontal or vertical;

extracting the region of a row based on a result of projecting said document image in a direction different from a direction of said horizontal or vertical directions, as determined by said direction determining means, to extract in the region of said document image the region of a row including the image of said arbitrary character string; and correcting said manually drawn free curve line portion into a normal line portion placed along the region of said row extracted by said extracting step, adjusting a distance between said free curve line portion corrected and said extracted row and displaying at said display portion of said free curve portion adjusted, said second processing portion including, determining the direction of the manually input free curve line portion, wherein the direction of the manually input free curve line portion may be horizontal or vertical;

extracting in the region of a document image the region of a row including the image of said arbitrary character string, as based on a direction determined by said direction determining means and an image of at least one character in said document image;

projecting said document image in a direction identical to the direction determined by said direction determining step, and based on a result of said projecting to extract a character respectively; and correcting said free curve line portion into a normal line portion drawn along the region of said row extracted by said row extracting step, determining start and end points of said free curve line portion corrected, as based on said extracted character respectively, and displaying said free curve line portion at said display portion, thereby displaying the normal line portion; wherein said line correcting means has ruby row recognizing means for recognizing if the region of said row extracted by said row extracting means corresponds to a row of rubies including kana given alongside Chinese characters, and corrects said manually input free curve line portion into said normal line portion drawn along the region of said row of rubies when the region of said row is recognized as corresponding to said row of rubies by said ruby row recognizing means.

15. The document image processing apparatus of claim 1, wherein the normal line portion is placed in a position using information obtained by the direction determining means and the row extracting means.

16. The method of processing a document image of claim 13, wherein the normal line portion is placed in a position using information obtained by the determining step and the extracting step.

17. The computer-readable recording medium step of claim 14, wherein the normal line portion is placed in a position using information obtained by the determining step and the extracting step.

18. The document image processing step of claim 1, wherein the free curve line portion is handwritten.

19. The method of processing a document image of claim 13, wherein the free curve line portion is handwritten.

20. The computer-readable recording medium of claim 14, wherein the free curve line portion is handwritten.

* * * * *